(12) United States Patent
Li et al.

(10) Patent No.: US 11,489,609 B2
(45) Date of Patent: Nov. 1, 2022

(54) DATA PROCESSING METHOD AND APPARATUS, DEVICE, STORAGE MEDIUM, AND PROCESSOR

(71) Applicant: ZTE CORPORATION, Guangdong (CN)

(72) Inventors: Weimin Li, Guangdong (CN); Zhifeng Yuan, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 239 days.

(21) Appl. No.: 16/628,160

(22) PCT Filed: Jun. 27, 2018

(86) PCT No.: PCT/CN2018/093181
§ 371 (c)(1),
(2) Date: Jan. 2, 2020

(87) PCT Pub. No.: WO2019/007242
PCT Pub. Date: Jan. 10, 2019

(65) Prior Publication Data
US 2021/0367698 A1    Nov. 25, 2021

(30) Foreign Application Priority Data
Jul. 3, 2017  (CN) .......................... 201710533757.0

(51) Int. Cl.
*H04J 13/00*    (2011.01)
*H04J 13/12*    (2011.01)
(Continued)

(52) U.S. Cl.
CPC ...... *H04J 13/0048* (2013.01); *H04B 1/70735* (2013.01); *H04J 11/003* (2013.01); *H04J 13/12* (2013.01)

(58) Field of Classification Search
CPC .... H04J 13/0048; H04J 13/12; H04J 11/0003; H04B 1/70735
(Continued)

(56) References Cited

U.S. PATENT DOCUMENTS

| 6,990,138 B2 | 1/2006 | Bejjani et al. |
| 2003/0156593 A1 | 8/2003 | McDonough et al. |

(Continued)

FOREIGN PATENT DOCUMENTS

| CN | 1319283 A | 10/2001 |
| CN | 101136897 A | 3/2008 |

(Continued)

OTHER PUBLICATIONS

European Search Report and Written Opinion for the European Patent Application No. EP18828559, dated Feb. 17, 2021, 8 pages.
(Continued)

*Primary Examiner* — Candal Elpenord
(74) *Attorney, Agent, or Firm* — KDB Firm PLLC

(57) ABSTRACT

Disclosed are a data processing method and apparatus, a device, a storage medium, and a processor. The data processing method includes: acquiring a first sequence, where the first sequence includes one of: a sequence obtained by processing a first specified element of a second sequence, or a sequence acquired from a first sequence set, and the first sequence set includes one of: a sequence set obtained by processing M sequence sets, or a preset first sequence set; and processing first data by using the first sequence, where M is an integer greater than or equal to 1.

18 Claims, 5 Drawing Sheets

Acquire a first sequence; where the first sequence includes one of: a sequence obtained by processing a first specified element of a second sequence or a sequence acquired from a first sequence set, and the first sequence set includes one of: a sequence set obtained by processing M sequence sets, or a preset first sequence set — S102

Process first data by using the first sequence, where M is an integer greater than or equal to 1 — S104

(51) Int. Cl.
*H04J 11/00* (2006.01)
*H04B 1/7073* (2011.01)

(58) Field of Classification Search
USPC .......................................................... 370/209
See application file for complete search history.

(56) References Cited

U.S. PATENT DOCUMENTS

| | | | |
|---|---|---|---|
| 2007/0230600 A1* | 10/2007 | Bertrand | H04W 74/0833 375/260 |
| 2012/0176885 A1* | 7/2012 | Lee | H04L 5/0007 370/209 |
| 2014/0056332 A1* | 2/2014 | Soualle | G01S 19/02 375/146 |
| 2017/0187499 A1 | 6/2017 | Hwang et al. | |
| 2018/0054219 A1* | 2/2018 | Qian | H03M 13/6561 |
| 2019/0007175 A1* | 1/2019 | Kwak | H04L 5/0048 |
| 2019/0379567 A1* | 12/2019 | Kuchi | H04L 5/0007 |
| 2021/0297300 A1* | 9/2021 | Zhang | H04L 1/0045 |

FOREIGN PATENT DOCUMENTS

| | | |
|---|---|---|
| CN | 105991159 A | 10/2016 |
| CN | 108207028 A | 6/2018 |
| EP | 3211846 A1 | 8/2017 |
| EP | 3249824 A1 | 11/2017 |
| WO | 2016062120 A1 | 4/2016 |

OTHER PUBLICATIONS

Office Action for the Chinese Application No. 201710533757.0, dated Nov. 3, 2020, 8 pages.
Search Report for the Chinese Application No. 201705337570, dated Oct. 26, 2020, 8 pages.
International Search Report for the International Patent Application No. PCT/CN2018/093181, dated Oct. 8, 2018, 2 pages.
European Official Action dated Apr. 14, 2022, for EP 18828559.7 (five (5) pages).

* cited by examiner

DATA PROCESSING METHOD AND APPARATUS, DEVICE, STORAGE MEDIUM, AND PROCESSOR

CROSS-REFERENCE TO RELATED APPLICATIONS

This is a U.S. National Stage Application, filed under 35 U.S.C. 371, of International Patent Application No. PCT/CN2018/093181, filed on Jun. 27, 2018, which claims priority to Chinese patent application No. 201710533757.0 filed on Jul. 3, 2017, contents of both of which are incorporated herein by reference in their entireties.

TECHNICAL FIELD

The present application relates to communications field and, in particular, to a data processing method and apparatus, a device, a storage medium, and a processor.

BACKGROUND

Application scenarios of the 5th-Generation (5G) communication technology and the future communication technology include enhanced mobile broadband (eMBB), massive machine type communication (mMTC), and ultra-reliability low-latency communication (URLLC). The eMBB scenario is used for supporting mobile broadband, and its main service requirements are large data packet transmission, high data rate, and high spectrum efficiency. The mMTC scenario is used for supporting massive device communication, and its main service requirements are massive devices and small data packet transmission. Currently, the design goal for the 5G mMTC scenario determined by the International Telecommunications Union (ITU) and the 3rd Generation Partnership Project (3GPP) is to support the connection density of one million devices/km². The URLLC scenario is used for supporting high-reliability and low-delay communication, and its main service requirements are high-reliability and low-delay transmission.

For the requirements of the mMTC scenario of massive devices and small data packet transmission and the requirements of the URLLC scenario of high-reliability and low-delay transmission, a conventional design based on terminal random access, base station scheduling and control and other communication processes cannot satisfy these requirements, mainly due to limited system access device capacity, time-consuming access and data transmission process, and large signaling overhead.

In order to satisfy these requirements of the 5G communication technology as well as similar requirements of the future communication technology, a grant-free transmission method may be adopted. When a terminal device needs to send data, the data is sent immediately, such that the time-consuming and complicated random access process and scheduling and control process can be eliminated, thereby greatly reducing transmission delay and signaling overhead.

In order to improve utilization efficiency of transmission resources, multiple users can be allowed to share the same transmission resources (e.g., a time-frequency resource block) to perform non-orthogonal multiplexing, implementing non-orthogonal multiple access (NOMA). For the multi-user non-orthogonal access, transmission resources used by these users collide with each other. In order to ensure performance of multi-user non-orthogonal multiplexing transmission, an advanced receiver, such as an interference cancellation receiver, is needed.

Furthermore, the multi-user grant-free transmission and non-orthogonal access can also be implemented based on codes or sequences. For example, multiple users use low cross-correlation spreading codes or spreading sequences to spread their data to be sent and then transmit their data on the same transmission resources, such that detection performance of these users can be ensured through low cross-correlation spreading codes. However, the user data, after spreading, needs to occupy more resources, for example, a length of the spreading sequence is L, and in order to accommodate the spread information, the transmission resources need to be enlarged by L times.

If the low cross-correlation spreading code is adopted, compared with a manner without spreading, K*L times of users can be supported to perform transmission on the same transmission resources, and it is considered that the adopting of low cross-correlation spreading codes can implement K times of user overload rate, that is, the adopting of low cross-correlation spreading codes has the potential to improve the system spectrum efficiency in multiples.

Therefore, the implementation of the multi-user grant-free transmission and non-orthogonal access based on codes or sequences helps to ensure multi-user detection performance, and can improve the system spectrum efficiency while implementing the low-delay access. The design of codes or sequences is very important. For example, a certain number of codes or sequences with low cross-correlation help to ensure the performance of the grant-free transmission and the non-orthogonal access and control the system complexity, thereby implementing effective grant-free transmission and the non-orthogonal access.

Currently, the 3GPP organization is studying and evaluating new radio access technology (NR or New RAT) that satisfies 5G requirements, and the transmission technology based on grant-free and NOMA is a popular candidate technology scheme for mMTC, URLLC, eMBB and other scenarios. At the 3GPP's RAN#75 meeting, it was agreed that the NOMA would be an agenda item which will be studied by setting up projects.

However, the NR currently does not determine the grant-free technology scheme and non-orthogonal multiple access technology scheme. For example, whether to implement the multi-user grant-free transmission and the non-orthogonal multiple access based on codes or sequences, how to specifically design the codes or sequences and the like are still under discussion.

In view of the above technical problems in the related art, no effective solution has yet been proposed.

SUMMARY

Embodiments of the present disclosure provide a data processing method and apparatus, a device, a storage medium, and a processor to at least solve the problem of design of codes or sequences in the related art.

According to an embodiment of the present disclosure, a data processing method is provided. The data processing method includes: acquiring a first sequence, and processing first data by using the first sequence. The first sequence includes one of: a sequence obtained by processing a first specified element of a second sequence, or a sequence acquired from a first sequence set, and the first sequence set includes one of: a sequence set obtained by processing M sequence sets, or a preset first sequence set, where M is an integer greater than or equal to 1.

According to an embodiment of the present disclosure, a data processing apparatus is provided. The data processing apparatus includes: an acquiring module, which is configured to acquire a first sequence, where the first sequence includes one of: a sequence obtained by processing a first specified element of a second sequence, or a sequence acquired from a first sequence set, and the first sequence set includes one of: a sequence set obtained by processing M sequence sets, or a preset first sequence set; and a processing module, which is configured to process first data by using the first sequence; where M is an integer greater than or equal to 1.

According to an embodiment of the present disclosure, a device is provided. The device includes a memory, a processor and a computer program stored in the memory and executable by the processor. When executing the computer program, the processor implements the method according to any one of the embodiments described above.

According to another embodiment of the present disclosure, a storage medium is provided. The storage medium stores a program which, when executed, executes the method according to any one of the embodiments described above.

According to yet another embodiment of the present disclosure, a processor is provided. The processor is configured to execute a program which, when executed, executes the method according to any one of the embodiments described above.

In the embodiments of the present disclosure, since the used first sequence is obtained after processing a first specified element of a second sequence or is acquired from a first sequence set, where the first sequence set may be a sequence set obtained by processing M sequence sets or a preset first sequence set, the problem of the design of codes or sequences in the related art can be solved. The sequence obtained through the embodiments of the present application can be used for implementing the grant-free transmission and non-orthogonal multiple access with good performance and efficiency.

BRIEF DESCRIPTION OF DRAWINGS

The drawings described herein are used to provide a further understanding of the present disclosure and form a part of the present application. The exemplary embodiments and descriptions thereof in the present disclosure are used to explain the present disclosure and not to limit the present disclosure in any improper way. In the drawings.

DETAILED DESCRIPTION

The present disclosure will be described hereinafter in detail with reference to the drawings in conjunction with embodiments. It is to be noted that if not in collision, the embodiments and features therein in the present disclosure may be combined with each other.

It is to be noted that the terms "first", "second" and the like in the description, claims and drawings of the present application are used to distinguish between similar objects and are not necessarily used to describe a particular order or sequence.

Embodiment 1

Figure 1:
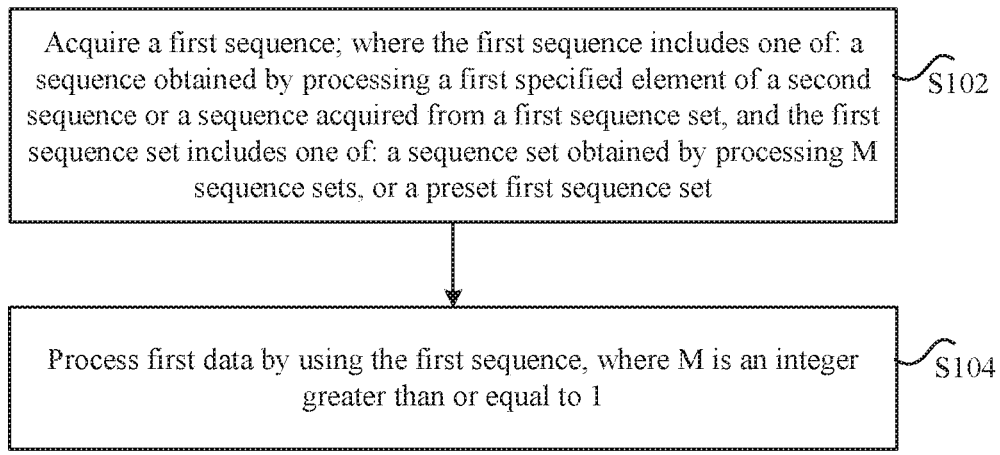
FIG. 1 is a flowchart one of a data processing method according to an embodiment of the present disclosure.

The embodiment of the present disclosure provides a data processing method. FIG. 1 is a flowchart one of a data processing method according to an embodiment of the present disclosure. As shown in FIG. 1, the method includes the steps described below.

In step S102, a first sequence is acquired. The first sequence includes one of: a sequence obtained by processing a first specified element of a second sequence, or a sequence acquired from a first sequence set, and the first sequence set includes one of: a sequence set obtained by processing M sequence sets, or a preset first sequence set.

In step S104, first data is processed by using the first sequence;

where M is an integer greater than or equal to 1.

Through the above steps, since the used first sequence is obtained after processing a first specified element of a second sequence or is acquired from a first sequence set, where the first sequence set may be a sequence set obtained by processing M sequence sets or a preset first sequence set, the problem of the design of codes or sequences in the related art can be solved. The sequence obtained through the embodiments of the present application can be used for implementing the grant-free transmission and non-orthogonal multiple access with good performance and efficiency.

It is to be understood by those skilled in the art that the first data may be any reasonable data existing or generated during communication. For example, the first data may be data bits obtained by encoding data bits to be sent of a sending end, or the first data may also be data symbols obtained by encoding and modulating data bits to be sent.

It is to be noted that the second sequence may be one of: a Hadamard sequence of a length L, a sequence of a length L acquired according to a Hadamard sequence generation method, a Walsh sequence of a length L, a sequence of a length L acquired according to a Walsh sequence generation method, a sequence of a length L acquired from a second sequence set, or a sequence whose element values are from a candidate value set, where L is an integer greater than 1.

It is to be noted that the second sequence set includes one of: a Hadamard matrix, a Hadamard sequence set, a Walsh sequence set, a preset second sequence set, or a sequence set obtained according to at least one of: a Hadamard matrix, a Hadamard sequence set, a Walsh sequence set, or a third sequence set. The Hadamard matrix contains L vectors each having a length L, the Hadamard sequence set contains L sequences each having a length L, and the Walsh sequence set contains L sequences each having a length L.

In one embodiment of the present disclosure, in a case where the second sequence is the sequence whose element values are from the candidate value set, a value of a second specified element of the second sequence is a preset value, the preset value is from the candidate value set, and a value of a third specified element of the second sequence is a value acquired from the candidate value set according to a first specified manner. The second specified element includes: an element indicated by an index preset by a system, or an element determined according to a system preset rule. The third specified element includes: an element indicated by an index preset by a system, or an element determined according to a system preset rule. The first specified manner includes one of: a random selection manner, system configuration information, or a system preset rule.

It is to be noted that the candidate value set includes one of: {1, 1i, −1, −1i}, {1, exp(1i*⅔*π), exp(1i*⅘*π)}, where i is an imaginary unit and is equal to sqrt(−1), and sqrt( ) is a square root operation.

In one embodiment of the present disclosure, the first specified element can be acquired in at least one of manners: acquiring the first specified element in a random selection manner, acquiring the first specified element according to system configuration information, acquiring the first specified element according to a system preset rule, or acquiring the first specified element according to information of the second sequence. The first specified element contains at least one element, and the information of the second sequence includes: index information of the second sequence, or index information of a sequence set to which the second sequence belongs.

In one embodiment of the present disclosure, in a case where the first sequence includes the sequence obtained by processing the first specified element of the second sequence, the step S102 may include at least one of: taking a sequence obtained by multiplying the first specified element of the second sequence by a first specified value as the first sequence; multiplying the first specified element of the second sequence by a second specified value and a third specified value respectively to obtain two sequences, combining the two sequences in a second specified manner to form one sequence, and using the one combined sequence as the first sequence; or taking a sequence, which is obtained by determining a value of the first specified element of the second sequence according to a fourth specified element of the second sequence, as the first sequence, where the fourth specified element includes: an element indicated by an index preset by a system, or an element determined according to a system preset rule.

It is to be noted that the first specified value may include one of: 0, −1+2i, −1−2i, 2, −2, 2i, −2i, 2+1/16, −(2+1/16), (2+1/16)*1i, −(2+1/16)*1i, 2+1/32, −(2+1/32), (2+1/32)*1i, −(2+1/32)*1i, sqrt(2+sqrt(5)), −sqrt(2+sqrt(5)), sqrt(2+sqrt(5))*1i, −sqrt(2+sqrt(5))*1i; ½*(sqrt(2)+sqrt(6)), ½*(sqrt(2)−sqrt(6)), −½*(sqrt(2)+sqrt(6)), −½*(sqrt(2)−sqrt(6)), ½*1i*(sqrt(2)+sqrt(6)), ½*1i*(sqrt(2)−sqrt(6)), −½*1i*(sqrt(2)+sqrt(6)), −½*1i*(sqrt(2)−sqrt(6)); 1+sqrt(3)*1i, 1−sqrt(3)*1i, ½*(1+sqrt(3))*(1+1i), ½*(1−sqrt(3))*(1+1i), ½*(1+sqrt(3))*(1−1i), ½*(1−sqrt(3))*(1−1i), −½*(1+sqrt(3))*(1+1i), −½*(1−sqrt(3))*(1+1i), −½*(1+sqrt(3))*(1−1i), −½*(1−sqrt(3))*(1−1i), a+ib; where a and b are real numbers, i is an imaginary unit and is equal to sqrt(−1), and sqrt( ) is a square root operation.

In one embodiment of the present disclosure, the second specified value is c+id, and the third specified value is 2−c−id; or the second specified value is (c+id)*1i, and the third specified value is (2−c−id)*1i; where c and d are real numbers, and i is an imaginary unit and is equal to sqrt(−1), and sqrt(is a square root operation.

In one embodiment of the present disclosure, the step of taking a sequence which is obtained by determining a value of the first specified element of the second sequence according to a fourth specified element of the second sequence as the first sequence may include one of: using a product of the third power of each element of the fourth specified elements of the second sequence as the value of the first specified element of the second sequence, and using the obtained sequence as the first sequence; or using a product of the square of the element contained in the fourth specified elements of the second sequence and a specified value as the value of the first specified element of the second sequence, and using the obtained sequence as the first sequence.

It is to be noted that the M sequence sets may include one of: one Hadamard matrix, one Hadamard sequence set, one Walsh sequence set, M preset sequence sets, M sequence sets obtained according to at least one of: a Hadamard matrix, a Hadamard sequence set, a Walsh sequence set, or a fourth sequence set, or M sequence sets obtained by splitting one sequence set, where the Hadamard matrix contains L vectors each having a length L, the Hadamard sequence set contains L sequences each having a length L, and the Walsh sequence set contains L sequences each having a length L, where L is an integer greater than 1.

It is to be noted that in a case where the first sequence set includes the sequence set obtained by processing M sequence sets, the first sequence set may be acquired in one of following manners.

In a case where the M sequence sets are one sequence set, an element with an index of X of each sequence of the one sequence set is multiplied by a fourth specified value to obtain a sequence set $B_X$, where $0 \leq X \leq L1-1$, X is an integer, and L1 is a sequence length of the each sequence. The one sequence set contains N1 sequences, where N1 is an integer greater than or equal to 1. The obtained sequence sets $B_X$ are combined to form the first sequence set, where the first sequence set contains N1×L1 sequences each having a length L1.

An element with an index of Y of each sequence of a sequence set with an index of m in the M sequence sets is multiplied by a fifth specified value to obtain a sequence set $B_m$, where $0 \leq m \leq M-1$, m is an integer, $0 \leq Y \leq L2-1$, Y is an integer. L2 is a sequence length of the each sequence, and each sequence set in the M sequence sets contains N2 sequences, where N2 is an integer greater than or equal to 1. The obtained sequence sets $B_m$ are combined to form the first sequence set, where the first sequence set contains N2×M sequences each having a length L2.

An element with an index of Z of each sequence of a sequence set with an index of m in the M sequence sets is multiplied by a sixth specified value and a seventh specified value respectively to obtain a sequence set $C_m$ and a sequence set $D_m$, and the obtained sequence set $C_m$ and the obtained sequence set $D_m$ are combined in a third specified manner to form a sequence set $E_m$, where $0 \leq m \leq M-1$, m is an integer, $0 \leq Z \leq L3-1$, Z is an integer. L3 is a sequence length of the each sequence. Each sequence set in the M sequence sets contains N3 sequences, where N3 is an integer greater than or equal to 1. The sequence set $E_m$ contains N3 sequences each having a length L3×2. The obtained sequence sets $E_m$ are combined to form the first sequence set, where the first sequence set contains N3×M sequences of length L3×2.

It is to be noted that an available value of the fourth specified value may be equal to an available value of the first specified value; an available value of the fifth specified value may also be equal to the available value of the first specified value; and available values of the sixth specified value and the seventh specified value may be equal to available values of the second specified value and the third specified value respectively.

In one embodiment of the present disclosure, in a case where the first sequence is the sequence acquired from the first sequence set, the step S102 may include: acquiring the first sequence from the first sequence set according to a fourth specified manner; where the fourth specified manner includes at least one of: a random selection manner, system configuration information, or a system preset rule.

In one embodiment of the present disclosure, the step S104 may include: performing specified processing on the first data by using the first sequence; where the specified processing includes at least one of: spreading processing, mapping processing, modulation processing, de-spreading processing, de-mapping processing, demodulation processing, or system preset processing.

In one embodiment of the present disclosure, the method may further include at least one of: an amplitude value of each element of the first sequence being one of a first amplitude value or a second amplitude value; amplitude values of all sequence elements in the first sequence set being one of the first amplitude value or the second amplitude value; or cross-correlation between any two sequences in the first sequence set being equal.

By ensuring that the cross-correlation between any two sequences is equal or nearly equal, the obtained sequence used in the embodiment of the present disclosure can obtain good performance. In addition, the embodiment of the present disclosure has lower sequence storage requirements and lower operation complexity, thereby implementing effects of low storage requirements and low operation complexity.

In the embodiment of the present disclosure, after the step S104, the method may further include the step described below.

Second data is mapped to a specified transmission resource for generating a transmission signal and sending, where the second data is obtained by processing the first data using the first sequence.

It is to be noted that the specified transmission resource may be randomly selected, preset by a system or configured by a system.

It is to be noted that the transmission resource includes at least one of: a carrier, a slot, a time-frequency domain resource, a space domain resource, a code domain resource, a frequency hopping mode, or an antenna port, and may be defined as or in the form of a resource unit, a resource block, a resource set, or a resource pattern.

For the data processing method described above, the embodiment of the present disclosure will further describe the following aspects.

(1) The data processing method described in the embodiment of the present disclosure may be applied to a transmitter and/or a receiver, or may be applied to a terminal device and/or a base station device.

(2) The data processing method described in the embodiment of the present disclosure may further include at least one of characteristics: an amplitude value of each element of the first sequence being one of a first amplitude value or a second amplitude value; amplitude values of all sequence elements in the first sequence set being one of the first amplitude value or the second amplitude value; or cross-correlation between any two sequences in the first sequence set being equal or nearly equal.

(3) i and j both may be an imaginary unit and are equal to sqrt(−1), both them can represent the same meaning, and different situations, such as 1i, 1j, i, j and the like, may exist in the description of the embodiment of the present disclosure and can be considered to be the same, where sqrt( ) represents a square root operation.

(4) The sequence or the sequence set in the embodiment of the present disclosure is not unique, and on the basis of the description in the embodiments and the present disclosure, other similar sequences or sequence sets may be acquired, which will not be described in the embodiments of the present disclosure.

(5) The index or order of sequences contained in the sequence set in the embodiment of the present disclosure is not fixed or unique, and may be other indexes or orders.

(6) The energy normalization processing may be further performed on the sequence or the sequence set in the embodiment of the present disclosure, such that the energy of each sequence element is 1, or the total energy of each sequence is 1, or the total energy of each sequence is equal to the sequence length L.

(7) The data processing method described in the embodiment of the present disclosure may be applied to at least one of following scenarios: grant-free transmission, or non-orthogonal multiple access.

The data processing method illustrated in FIG. 1 will be described below in detail through several embodiments.

Embodiment 2

Figure 2:
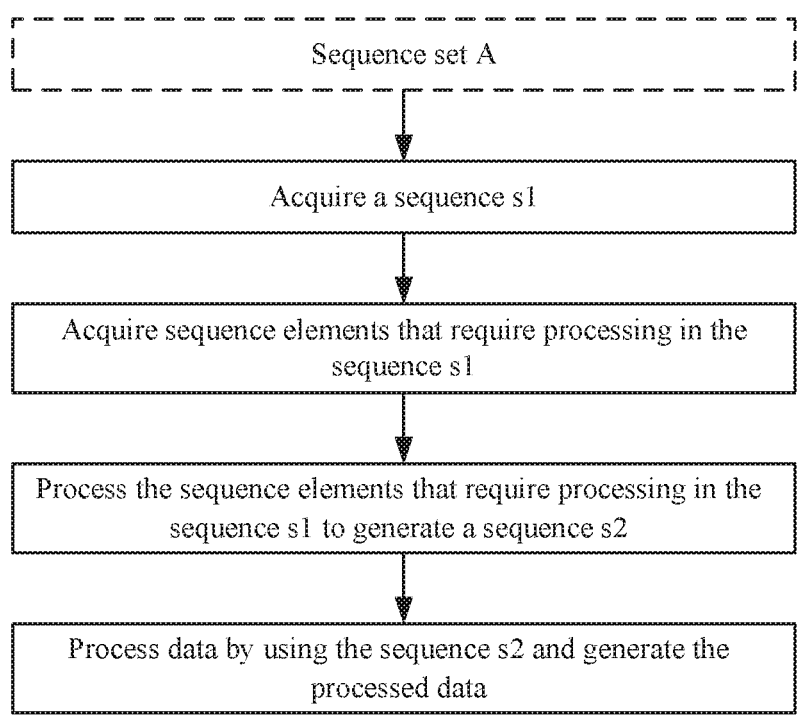
FIG. 2 is a flowchart two of a data processing method according to an embodiment of the present disclosure.

A data processing method provided by the embodiment is shown in FIG. 2. FIG. 2 is a flowchart two of a data processing method according to an embodiment of the present disclosure.

In the embodiment, a sequence set A is a Hadamard sequence set including 8 sequences each having a length L of 8, and 8 sequence vectors each having a length of 8 in the sequence set may form an eighth-order Hadamard matrix, as shown in the table 1. The first column in the table 1 is the sequence index, the second row in the table 1 is the sequence element index, and the second to ninth columns from the third row are sequence elements. For example, sequence elements of the sequence with a sequence index of 0 include $\{1, 1, 1, 1, 1, 1, 1, 1\}$, and sequence element indexes are 0, 1, 2, 3, 4, 5, 6 and 7 respectively.

TABLE 1

| Sequence index | Sequence element index and sequence element | | | | | | | |
|---|---|---|---|---|---|---|---|---|
| | 0 | 1 | 2 | 3 | 4 | 5 | 6 | 7 |
| 0 | 1 | 1 | 1 | 1 | 1 | 1 | 1 | 1 |
| 1 | 1 | −1 | 1 | −1 | 1 | −1 | 1 | −1 |
| 2 | 1 | 1 | −1 | −1 | 1 | 1 | −1 | −1 |
| 3 | 1 | −1 | −1 | 1 | 1 | −1 | −1 | 1 |
| 4 | 1 | 1 | 1 | 1 | −1 | −1 | −1 | −1 |
| 5 | 1 | −1 | 1 | −1 | −1 | 1 | −1 | 1 |
| 6 | 1 | 1 | −1 | −1 | −1 | −1 | 1 | 1 |
| 7 | 1 | −1 | −1 | 1 | −1 | 1 | 1 | −1 |

A sequence s1 is acquired from the sequence set A. The sequence s1 may be acquired in a random selection manner, or according to system pre-configuration information, or according to a system signaling indicator, or according to a system preset rule. Assumed that an index of the acquired sequence s1 is 0, the sequence s1 is [1, 1, 1, 1, 1, 1, 1, 1].

A sequence element to be processed in the sequence s1 is acquired, and the sequence element to be processed may be preset by the system, or may be acquired in a random selection manner, or according to system pre-configuration information, or according to a system signaling indicator, or according to a system preset rule. It is assumed that an index of the acquired sequence element is 1.

The sequence element with an index of 1 in the sequence s1 is processed. Specifically, the sequence element with an index of 1 in the sequence s1 is multiplied by a specified value v to generate a sequence s2, where a value of v may be −1+2i or −1−2i. Assumed that v is −1+2i, the sequence s2 is [1, −1+2i, 1, 1, 1, 1, 1, 1].

Then, data is processed by using the sequence s2 to generate the processed data.

The data processing method provided by the embodiment can make cross-correlation between any two different sequences be equal by adjusting the value of the sequence element. The cross-correlation between any two different sequences is equal, which can be considered that interference introduced due to sequence non-orthogonality between any two users is equal, such that interference fluctuations between users will not be great and robustness can be ensured.

In the embodiment, the sequence set A may be a preset Hadamard sequence set, or may be a Hadamard sequence set acquired according to a Hadamard sequence generation method. The sequence s1 is a sequence acquired from the Hadamard sequence set A, and can be regarded as a Hadamard sequence. The sequence s1 may also be acquired from the Hadamard matrix, or may also be acquired according to the Hadamard sequence generation method.

In the embodiment, the sequence set A may also be a preset Walsh sequence set or a Walsh sequence set acquired according to a Walsh sequence generation method. At this point, the sequence s1 is a sequence acquired from the Walsh sequence set A, and can be regarded as a Walsh sequence. The sequence s1 may also be acquired according to the Walsh sequence generation method.

When the data processing method provided in the embodiment is applied to the transmitter or the terminal device, spreading processing, mapping processing, modulation processing or system first preset processing can be performed on the data by using the sequence s2 to generate the processed data; when the data processing method is applied to the receiver or the base station device, de-spreading processing, de-mapping processing, demodulation processing or system second preset processing can be performed on the data by using the sequence s2 to generate the processed data.

Embodiment 3

The flowchart of a data processing method provide by the embodiment is similar to FIG. 2. In the embodiment, the sequence set A is a sequence set containing 16 sequences with a length L of 4, as shown in the table 2.

TABLE 2

| Sequence index | Sequence element index and sequence element | | | |
|---|---|---|---|---|
| | 0 | 1 | 2 | 3 |
| 0 | 1 | 1 | 1 | 1 |
| 1 | 1 | 1 | −1 | −1 |
| 2 | 1 | −1 | 1 | −1 |
| 3 | 1 | −1 | −1 | 1 |
| 4 | 1 | 1 | 1i | −1i |
| 5 | 1 | 1 | −1i | 1i |
| 6 | 1 | −1 | 1i | 1i |
| 7 | 1 | −1 | −1i | −1i |
| 8 | 1 | 1i | 1 | −1i |
| 9 | 1 | 1i | −1 | 1i |
| 10 | 1 | −1i | 1 | 1i |
| 11 | 1 | −1i | −1 | −1i |
| 12 | 1 | 1i | 1i | −1 |
| 13 | 1 | 1i | −1i | 1 |
| 14 | 1 | −1i | 1i | 1 |
| 15 | 1 | −1i | −1i | −1 |

A sequence s1 is acquired from the sequence set A in a random selection manner, or according to system pre-configuration information, or according to a system signaling indicator, or according to a system preset rule. Assumed that an index of the acquired sequence s1 is 5, the sequence s1 is [1, 1, −1i, 1i].

A sequence element to be processed in the sequence s1 is acquired. In the embodiment, the sequence element to be processed is acquired according to an association relationship or a correspondence between the sequence index and a specified sequence element index. Specifically, a value set of the specified sequence element index is {0, 2, 3, 1}, and an index of the sequence element to be processed is acquired from the value set of the specified sequence element index according to floor(sequence index/sequence length)+1, where floor( ) represents a rounding down operation. That is, for sequence indexes 0, 1, 2 and 3, the calculation result of floor(sequence index/sequence length)+1 is 1, a first value is acquired from the value set of the specified sequence element index and is used as the index of the sequence element to be processed, that is, the index of the sequence element to be processed is 0. Similarly, for sequence indexes 4, 5, 6 and 7, the index of the sequence element to be processed is 2; for sequence indexes 8, 9, 10 and 11, the index of the sequence element to be processed is 3; for sequence indexes 12, 13, 14 and 15, the index of the sequence element to be processed is 1; since the index of the sequence s1 is 5, the index of the acquired sequence element to be processed is 2.

The sequence element with an index of 2 in the sequence s1 is processed. Specifically, the sequence element with an index of 2 in the sequence s1 is multiplied by a specified value v to generate a sequence s2, where a value of v may be one of: 2, −2, 2i, −2i, 2+1/16, −(2+1/16), (2+1/16)*i, −(2+1/16)*i, 2+1/32, −(2+1/32), (2+1/32)*i, −(2+1/32)*i, sqrt(2+sqrt(5)), −sqrt(2+sqrt(5)), sqrt(2+sqrt(5))*i, or −sqrt(2+sqrt(5))*i. Assumed that v is 2, the sequence s2 is [1, 1, −2*1i, 1i].

Then, in the embodiment, data is processed by using the sequence s2 to generate the processed data.

In the embodiment, the sequence set A may also be a sequence set containing 9 sequences each having a length L of 3, as shown in the table 3.

TABLE 3

| Sequence index | Sequence element index and sequence element | | |
|---|---|---|---|
| | 0 | 1 | 2 |
| 0 | 1 | 1 | 1 |
| 1 | 1 | exp(1*2/3*π) | exp(1*4/3*π) |
| 2 | 1 | exp(1*4/3*π) | exp(1*2/3*π) |
| 3 | 1 | 1 | exp(1*2/3*π) |
| 4 | 1 | exp(1*2/3*π) | 1 |
| 5 | 1 | exp(1*4/3*π) | exp(1*4/3*π) |
| 6 | 1 | 1 | exp(1*4/3*π) |
| 7 | 1 | exp(1*2/3*π) | exp(1*2/3*π) |
| 8 | 1 | exp(1*4/3*π) | 1 |

The sequence s1 is acquired from the sequence set A. Assumed that the index of the acquired sequence s1 is 3, the sequence s1 is [1, 1, exp(i*2/3*π)].

A sequence element to be processed in the sequence s1 is acquired. In the embodiment, the sequence element to be processed is acquired according to an association relationship or a correspondence between the sequence index and a specified sequence element index. Specifically, a value set of the specified sequence element index is {0, 1, 2}, and an index of the sequence element to be processed is acquired from the value set of the specified sequence element index according to floor(sequence index/sequence length)+1. That is, for sequence indexes 0, 1 and 2, the calculation result of floor(sequence index/sequence length)+1 is 1, a first value is acquired from the value set of the specified sequence element index and is used as the index of the sequence element to be processed, that is, the index of the sequence element to be processed is 0. Similarly, for sequence indexes 3, 4 and 5, the index of the sequence element to be processed is 1; for sequence indexes 6, 7 and 8, the index of the sequence element to be processed is 2; since the index of the sequence s1 is 3, the index of the acquired sequence element to be processed is 1. The sequence element with an index of 1 in the sequence s1 is processed. Specifically, the sequence element with an index of 1 in the sequence s1 is multiplied by a specified value v to generate a sequence s2, where a value of v may be 0. Therefore, the sequence s2 is [1, 0, exp(i*⅔*π)].

Then, in the embodiment, the data is processed by using the sequence s2 to generate the processed data.

In the embodiment, the sequence set A may also be a sequence set containing 6 sequences with a length L of 3, as shown in the table 3A.

TABLE 3A

| Sequence index | Sequence element index and sequence element | | |
|---|---|---|---|
| | 0 | 1 | 2 |
| 0 | 0 | 1 | 1 |
| 1 | 0 | 1 | −1 |
| 2 | 1 | 1 | 0 |
| 3 | 1 | −1 | 0 |
| 4 | 1 | 0 | 1 |
| 5 | −1 | 0 | 1 |

The sequence s1 is acquired from the sequence set A. Assumed that the index of the acquired sequence s1 is 2, the sequence s1 is [1, 1, 0].

A sequence element to be processed in the sequence s1 is acquired. In the embodiment, the sequence element to be processed is acquired according to an association relationship or a correspondence between the sequence index and a specified sequence element index. Specifically, a value set of the specified sequence element index is {2, 1, 0}, and an index of the sequence element to be processed is acquired from the value set of the specified sequence element index according to floor(sequence index/2)+1. That is, for sequence indexes 0 and 1, the calculation result of floor (sequence index/2)+1 is 1, a first value is acquired from the value set of the specified sequence element index and is used as the index of the sequence element to be processed, that is, the index of the sequence element to be processed is 2. Similarly, for sequence indexes 2 and 3, the index of the sequence element to be processed is 1; for sequence indexes 4 and 5, the index of the sequence element to be processed is 0; since the index of the sequence s1 is 2, the index of the acquired sequence element to be processed is 1.

The sequence element with an index of 1 in the sequence s1 is processed. Specifically, the sequence element with an index of 1 in the sequence s1 is multiplied by a specified value v to generate a sequence s2, where a value of v may be (1+sqrt(5))/2. Therefore, the sequence s2 is [1, (1+sqrt(5))/2, 0].

Then, in the embodiment, the data is processed by using the sequence s2 to generate the processed data.

Alternatively, the sequence set A may also be a sequence set containing 3 sequences each having a length L of 3, as shown in the table 3B.

TABLE 3B

| Sequence index | Sequence element index and sequence element | | |
|---|---|---|---|
| | 0 | 1 | 2 |
| 0 | 0 | 1 | 1 |
| 1 | 1 | 1 | 0 |
| 2 | 1 | 0 | 1 |

The sequence s1 is acquired from the sequence set A. Assumed that the index of the acquired sequence s1 is 1, the sequence s1 is [1, 1, 0].

A sequence element to be processed in the sequence s1 is acquired. In the embodiment, the sequence element to be processed is acquired according to an association relationship or a correspondence between the sequence index and a specified sequence element index. Specifically, a value set of the specified sequence element index is {2, 1, 0}, and an index of the sequence element to be processed is acquired from the value set of the specified sequence element index according to (sequence index+1). That is, for the sequence index 0, the calculation result of (sequence index+1) is 1, a first value is acquired from the value set of the specified sequence element index and is used as the index of the sequence element to be processed, that is, the index of the sequence element to be processed is 2. Similarly, for the sequence index 1, the index of the sequence element to be processed is 1; for the sequence index 2, the index of the sequence element to be processed is 0. Since the index of the sequence s1 is 1, the index of the acquired sequence element to be processed is 1.

The sequence element with an index of 1 in the sequence s1 is processed. Specifically, the sequence element with an index of 1 in the sequence s1 is multiplied by a specified value v or −v to generate a sequence s2, where one of v and −v is selected in a random selection manner, or according to system pre-configuration information, or according to a system preset rule, and a value of v may be (1+sqrt(5))/2. Assumed that the sequence element with an index of 1 in the sequence s1 is multiplied by v, the generated sequence s2 is [1, (1+sqrt(5))/2, 0].

Then, in the embodiment, the data is processed by using the sequence s2 to generate the processed data.

In the embodiment, the sequence set A may also be a sequence set containing 4 sequences each having a length L of 2, as shown in the table 4.

TABLE 4

| Sequence index | Sequence element index and sequence element | |
|---|---|---|
| | 0 | 1 |
| 0 | 1 | 1 |
| 1 | 1 | −1 |
| 2 | 1 | i |
| 3 | 1 | −i |

The sequence s1 is acquired from the sequence set A. Assumed that the index of the acquired sequence s1 is 1, the sequence s1 is [1, −1].

A sequence element to be processed in the sequence s1 is acquired. In the embodiment, the sequence element to be processed is acquired according to an association relationship or a correspondence between the sequence index and a specified sequence element index. Specifically, a value set of the specified sequence element index is {0, 1}, and an index of the sequence element to be processed is acquired from the value set of the specified sequence element index according to floor(sequence index/sequence length)+1. That is, for sequence indexes 0 and 1, the calculation result of floor (sequence index/sequence length)+1 is 1, a first value is acquired from the value set of the specified sequence element index and is used as the index of the sequence element to be processed, that is, the index of the sequence element to be processed is 0. Similarly, for sequence elements 2 and 3, the index of the sequence element to be processed is 1. Since the index of the sequence s1 is 1, the index of the acquired sequence element to be processed is 0.

The sequence element with an index of 0 in the sequence s1 is processed. Specifically, the sequence element with an index of 0 in the sequence s1 is multiplied by a specified value v to generate a sequence s2, where a value of v may be one of: ½*(sqrt(2)+sqrt(6)), ½*(sqrt(2)−sqrt(6)), −½*(sqrt(2)+sqrt(6)), −½*(sqrt(2)−sqrt(6)), ½*i*(sqrt(2)+sqrt(6)), ½*i*(sqrt(2)−sqrt(6)), −½*i*(sqrt(2)+sqrt(6)), or −½*i*(sqrt(2)−sqrt(6)). Assumed that v is 1/2*(sqrt(2)+sqrt(6)), the sequence s2 is [½*(sqrt(2)+sqrt(6)), −1].

Then, in the embodiment, the data is processed by using the sequence s2 to generate the processed data.

According to the data processing method provided by the embodiment, when some specified values v are used, cross-correlation between any two different sequences generated and used is equal; when other specified values v are used, cross-correlation between any two different sequences generated and used is nearly equal.

Taking sequences with a length of 4 in the table 2 as an example, when the value of v is one of: sqrt(2+sqrt(5)), −sqrt(2+sqrt(5)), sqrt(2+sqrt(5))*i, or −sqrt(2+sqrt(5))*i, cross-correlation between any two different sequences is equal.

When the value of v is one of: 2, −2, 2i, −2i, 2+1/16, −(2+1/16), (2+1/16)*i, −(2+1/16)*i, 2+1/32, −(2+1/32), (2+1/32)*i, or −(2+1/32)*i, cross-correlation between any two different sequences is nearly equal. The cause of nearly equal cross-correlation is the quantization on the value of v, and the quantization has the advantage of reducing storage and computing overhead of the sequence; that is, in the embodiment, by quantizing and specifying v, not only resource overhead can be reduced, but any two different sequences whose cross-correlation is equal or nearly equal can be obtained, greatly improving the robustness.

In the embodiment, the sequence set A may be a preset sequence set.

In the embodiment, for example, a value set of the specified sequence element index is {0, 2, 3, 1}, the value set contains four values, and an index of the sequence element to be processed is acquired from the value set of the specified sequence element index according to floor(sequence index/sequence length)+1. When the calculation result of floor(sequence index/sequence length)+1 is 1, a first value is acquired from the value set of the specified sequence element index and is used as the index of the sequence element to be processed, that is, 0. If the values in the value set of the specified sequence element index are further indexed by 0, 1, 2 and 3, the index of the sequence element to be processed can be acquired from the value set of the specified sequence element index according to floor(sequence index/sequence length); when the calculation result of floor(sequence index/sequence length) is 0, a value corresponding to index 0 is acquired from the value set of the specified sequence element index and used as the index of the sequence element to be processed, that is, 0.

Embodiment 4

The embodiment provides a data processing method. In the embodiment, a sequence s with a length of 4 is first acquired, sequence element indexes are 0, 1, 2 and 3 respectively, and a candidate value set of the sequence element is {1, −1, 1i, −1i}.

A sequence element s0 with an index of 0 in the sequence s is a preset value 1.

A value is randomly selected from the candidate value set as a sequence element $s_1$ with an index of 1 in the sequence s, and it is assumed that $s_1$ is 1 herein.

A value is randomly selected from the candidate value set as a sequence element $s_2$ with an index of 2 in the sequence s, and it is assumed that s2 is 1i herein.

A sequence element $s_3$ in the sequence s is processed. Specifically, the sequence element s3 with an index of 3 in the sequence s is determined according to sequence elements $s_1$ and $s_2$. The determination method is $s_3=s_{13}*s_{23}$, and then $s_3=s_{13}*s_{23}=-1i$. Therefore, the acquired sequence s is [1, 1, 1i, −1i].

Then, in the embodiment, the data is processed by using the sequence s to generate the processed data.

In the embodiment, alternatively, a sequence s with a length of 3 may be first acquired, sequence element indexes are 0, 1 and 2 respectively, and a candidate value set of the sequence element is {1, exp(1i*⅔*π), exp(1i*4/3*)}.

A sequence element s0 with an index of 0 in the sequence s is a preset value 1.

A value is randomly selected from the candidate value set as a sequence element $s_1$ with an index of 1 in the sequence s, and it is assumed that $s_1$ is exp(1i*⅔*π) herein.

A value is randomly selected from the candidate value set as a weight value v', and it is assumed that v' is 1 herein.

A sequence element $s_2$ in the sequence s is processed. Specifically, the sequence element $s_2$ with an index of 2 in the sequence s is determined according to the sequence element $s_1$ and the weight value v'. The determination method is $s_2=s_{12}*v'$, and then $s_2=s1^2*v'=\exp(1i*4/3*\pi)$. Therefore, the acquired sequence s is [1, exp(1i*⅔*π), exp(1i*4/3*π)].

Then, in the embodiment, the data is processed by using the sequence s to generate the processed data.

In the embodiment, when the sequence s with a length of 4 is acquired according to the candidate value set of the sequence element {1, −1, 1i, −i1}, this sequence s may also be acquired in the following manner. A sequence element s0 with an index of 0 in the sequence s is preset to be 1. A value is randomly selected from the candidate value set as a sequence element $s_1$ with an index of 1 in the sequence s, and it is assumed that $s_1$ is 1 in the present embodiment. A value is randomly selected from the candidate value set as a sequence element $s_2$ with an index of 2 in the sequence s, and it is assumed that $s_2$ is 1i in the present embodiment. A value is randomly selected from the candidate value set as a sequence element $s_3$ with an index of 3 in the sequence s, and it is assumed that $s_3$ is −1i in the present embodiment. Then, the acquired sequence s is [1, 1, 1i, −1i]. Alternatively, a sequence set is obtained in the above manner. Since each of the sequence element with an index of 1, the sequence element with an index of 2 and the sequence element with an index of 3 have 4 optional values, the obtained sequence set will contain 4*4*4=64 sequences. A sequence is determined from the sequence set in a random selection manner as the acquired sequence. When the sequence s with a length of 3 is acquired according to the sequence element candidate value set {1, exp(1i*⅔*π), exp(1i*4/3*π)}, this sequence s may also be acquired in a similar manner.

Embodiment 5

Figure 3:
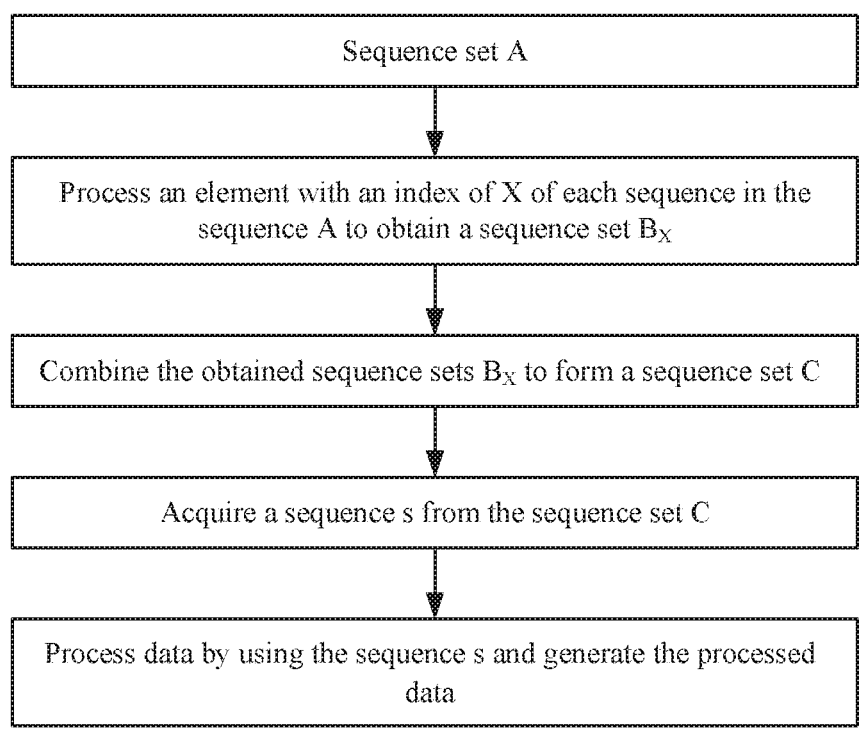
FIG. 3 is a flowchart three of a data processing method according to an embodiment of the present disclosure.

A data processing method provided by the embodiment is shown in FIG. 3. FIG. 3 is a flowchart three of a data processing method according to an embodiment of the present disclosure.

In the embodiment, a sequence set A is a Hadamard sequence set containing 8 sequences each having a length L of 8, and 8 sequence vectors each having a length of 8 in the sequence set may form an eighth-order Hadamard matrix, as shown in the table 5.

TABLE 5

| Sequence index | Sequence element index and sequence element | | | | | | | |
|---|---|---|---|---|---|---|---|---|
| | 0 | 1 | 2 | 3 | 4 | 5 | 6 | 7 |
| 0 | 1 | 1 | 1 | 1 | 1 | 1 | 1 | 1 |
| 1 | 1 | −1 | 1 | −1 | 1 | −1 | 1 | −1 |
| 2 | 1 | 1 | −1 | −1 | 1 | 1 | −1 | −1 |
| 3 | 1 | −1 | −1 | 1 | 1 | −1 | −1 | 1 |
| 4 | 1 | 1 | 1 | 1 | −1 | −1 | −1 | −1 |
| 5 | 1 | −1 | 1 | −1 | −1 | 1 | −1 | 1 |
| 6 | 1 | 1 | −1 | −1 | −1 | −1 | 1 | 1 |
| 7 | 1 | −1 | −1 | 1 | −1 | 1 | 1 | −1 |

An element with an index of X of each sequence in the sequence set A is processed. For example, the element with an index of X is multiplied by a specified value v to obtain a sequence set $B_X$, where X is an integer greater than or equal to 0 and less than or equal to 7. The value of v may be $-1+2i$ or $-1-2i$. That is, the element with an index of 0 of each sequence in the sequence set A is multiplied by the specified value v to obtain a sequence set $B_0$, the element with an index of 1 of each sequence in the sequence set A is multiplied by the specified value v to obtain a sequence set $B_1$, and similarly, sequence sets $B_2$, $B_3$, $B_4$, $B_5$, $B_6$ and $B_7$ can be acquired.

The obtained sequence sets $B_X$ including B0, B1, B2, B3, B4, B5, B6 and B7 are combined to form a sequence set C, and accordingly the sequence set C contains 64 sequences each having a length of 8.

In the embodiment, the sequence set A may also be a Hadamard sequence set containing 3 sequences each having a length L of 3, and 3 sequence vectors each having a length of 3 in the sequence set may form a third-order Hadamard matrix, as shown in the table 6.

TABLE 6

| Sequence index | Sequence element index and sequence element | | |
|---|---|---|---|
| | 0 | 1 | 2 |
| 0 | 1 | 1 | 1 |
| 1 | 1 | exp(1*2/3*π) | exp(1*4/3*π) |
| 2 | 1 | exp(1*4/3*π) | exp(1*2/3*π) |

An element with an index of X of each sequence in the sequence set A is processed. For example, the element with an index of X is multiplied by a specified value v to obtain a sequence set $B_X$, where X is an integer greater than or equal to 0 and less than or equal to 2. The value of v may be one of: 0, −2, 1+sqrt(3)*i, or 1−sqrt(3)*i. That is, the element with an index of 0 of each sequence in the sequence set A is multiplied by the specified value v to obtain a sequence set $B_0$, the element with an index of 1 of each sequence in the sequence set A is multiplied by the specified value v to obtain a sequence set $B_1$, and the element with an index of 2 of each sequence in the sequence set A is multiplied by the specified value v to obtain a sequence set $B_2$.

The obtained sequence sets $B_X$ including $B_0$, $B_1$ and $B_2$ are combined to form a sequence set C, and accordingly the sequence set C contains 9 sequences each having a length of 3.

In the embodiment, the sequence set A may also a Hadamard sequence set containing 2 sequences with a length L of 2, and 2 sequence vectors with a length of 2 in the sequence set may form a second-order Hadamard matrix, as shown in the table 7.

TABLE 7

| Sequence index | Sequence element index and sequence element | |
|---|---|---|
| | 0 | 1 |
| 0 | 1 | i |
| 1 | 1 | −i |

An element with an index of X of each sequence in the sequence set A is processed. For example, the element with an index of X is multiplied by a specified value v to obtain a sequence set $B_X$, where X is an integer greater than or equal to 0 and less than or equal to 1, and a value of v may be one of: ½*(1+sqrt(3))*(1+i), ½*(1−sqrt(3))*(1+i), ½*(1+sqrt(3))*(1−i), ½*(1−sqrt(3))*(1−i), −½*(1+sqrt(3))*(1+i), −½*(1−sqrt(3))*(1+i), −½*(1+sqrt(3))*(1−i), or −½*(1−sqrt(3))*(1−i). That is, the element with an index of 0 of each sequence in the sequence set A is multiplied by the specified value v to obtain a sequence set $B_0$, and the element with an index of 1 of each sequence in the sequence set A is multiplied by the specified value v to obtain a sequence set $B_1$.

The obtained sequence sets $B_X$ including $B_0$ and $B_1$ are combined to form a sequence set C, and the sequence set C contains 4 sequences each having a length of 2.

The data processing method provided by the embodiment may acquire a sequence s from the sequence set C in a random selection manner, or according to system pre-configuration information, or according to a system signaling indicator, or according to a system preset rule. Then, the method processes the data by using the acquired sequence s to generate the processed data.

According to the data processing method provided by the embodiment, cross-correlation between any two different generated sequences is equal.

In the embodiment, the sequence set C acquired in a specified manner may also be directly used as a system preset sequence set, and then the data processing method provided by the embodiment may directly acquire a sequence from the preset sequence set, and process the data by using the acquired sequence to generate the processed data.

Embodiment 6

Figure 4:
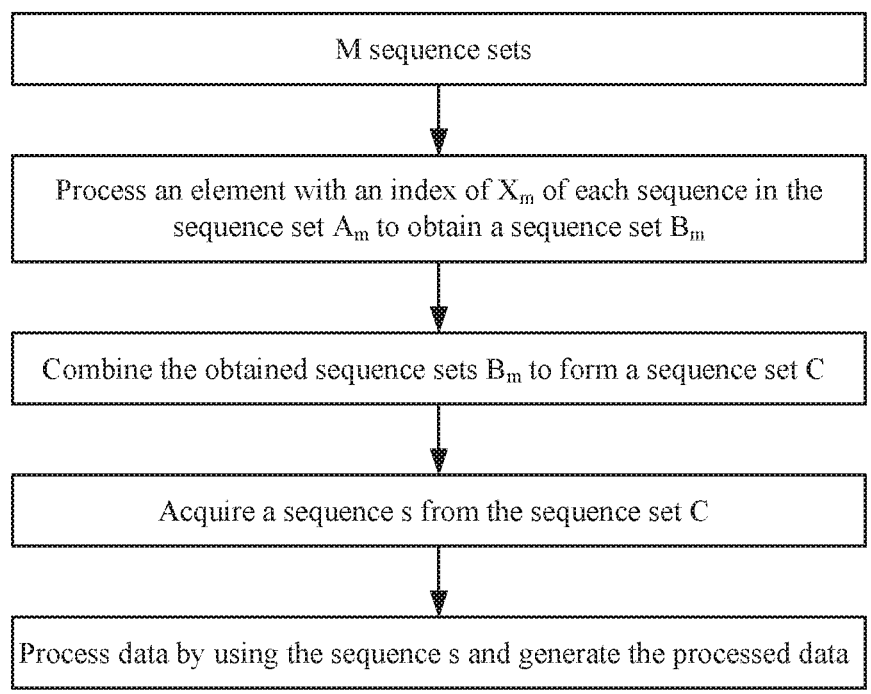
FIG. 4 is a flowchart four of a data processing method according to an embodiment of the present disclosure.

A data processing method provided by the embodiment is shown in FIG. 4. FIG. 4 is a flowchart four of a data processing method according to an embodiment of the present disclosure.

In the embodiment, a sequence set C is first acquired according to M=4 sequence sets $A_0$, $A_1$, $A_2$ and $A_3$, and each of these four sequence sets contains 4 sequences each having a length of 4, as shown in the tables 8 to 11.

TABLE 8

| Sequence index | Sequence element index and sequence element | | | |
|---|---|---|---|---|
| | 0 | 1 | 2 | 3 |
| 0 | 1 | 1 | 1 | 1 |
| 1 | 1 | 1 | −1 | −1 |
| 2 | 1 | −1 | 1 | −1 |
| 3 | 1 | −1 | −1 | 1 |

TABLE 9

| Sequence index | Sequence element index and sequence element | | | |
|---|---|---|---|---|
| | 0 | 1 | 2 | 3 |
| 0 | 1 | 1 | 1i | −1i |
| 1 | 1 | 1 | −1i | 1i |
| 2 | 1 | −1 | 1i | 1i |
| 3 | 1 | −1 | −1i | −1i |

TABLE 10

| Sequence index | Sequence element index and sequence element | | | |
|---|---|---|---|---|
| | 0 | 1 | 2 | 3 |
| 0 | 1 | 1i | 1 | −1i |
| 1 | 1 | 1i | −1 | 1i |
| 2 | 1 | −1i | 1 | 1i |
| 3 | 1 | −1i | −1 | −1i |

TABLE 11

| Sequence index | Sequence element index and sequence element | | | |
|---|---|---|---|---|
| | 0 | 1 | 2 | 3 |
| 0 | 1 | 1i | 1i | −1 |
| 1 | 1 | 1i | −1i | 1 |
| 2 | 1 | −1i | 1i | 1 |
| 3 | 1 | −1i | −1i | −1 |

An element with an index of $X_m$ of each sequence in the sequence set $A_m$ is processed. For example, the element with an index of $X_m$ is multiplied by a specified value v to obtain a sequence set $B_m$n, where m=0, 1, 2 and 3, $X_0$, $X_1$, $X_2$ and $X_3$ are equal to 0, 2, 3 and 1 respectively, and a value of v may be one of: 2, −2, 2i, −2i, 2+1/16, −(2+1/16), (2+1/16)*i, −(2+1/16)*i, 2+1/32, −(2+1/32), (2+1/32)*i, −(2+1/32)*i, sqrt(2+sqrt(5)), −sqrt(2+sqrt(5)), sqrt(2+sqrt(5))*i, or −sqrt(2+sqrt(5))*i. That is, the element with an index of $X_0$=0 of each sequence in the sequence set $A_0$ is multiplied by the specified value v to obtain a sequence set $B_0$, the element with an index of $X_1$=2 of each sequence in the sequence set $A_1$ is multiplied by the specified value v to obtain a sequence set $B_1$, the element with an index of $X_2$=3 of each sequence in the sequence set $A_2$ is multiplied by the specified value v to obtain a sequence set $B_2$, and the element with an index of $X_3$=1 of each sequence in the sequence set $A_3$ is multiplied by the specified value v to obtain a sequence set $B_3$.

The obtained sequence sets $B_m$ including $B_0$, $B_1$, $B_2$ and $B_3$ are combined to form a sequence set C, and the sequence set C contains 16 sequences each having a length of 4.

In the embodiment, the sequence set C may also be acquired according to M=3 sequence sets $A_0$, $A_1$ and $A_2$, and each of these three sequence sets contains 3 sequences each having a length of 3, as shown in the tables 12 to 14.

TABLE 12

| Sequence index | Sequence element index and sequence element | | |
|---|---|---|---|
| | 0 | 1 | 2 |
| 0 | 1 | 1 | 1 |
| 1 | 1 | exp(1*2/3*π) | exp(1*4/3*π) |
| 2 | 1 | exp(1*4/3*π) | exp(1*2/3*π) |

TABLE 13

| Sequence index | Sequence element index and sequence element | | |
|---|---|---|---|
| | 0 | 1 | 2 |
| 0 | 1 | 1 | exp(1*2/3*π) |
| 1 | 1 | exp(1*2/3*π) | 1 |
| 2 | 1 | exp(1*4/3*π) | exp(1*4/3*π) |

TABLE 14

| Sequence index | Sequence element index and sequence element | | |
|---|---|---|---|
| | 0 | 1 | 2 |
| 0 | 1 | 1 | exp(1*4/3*π) |
| 1 | 1 | exp(1*2/3*π) | exp(1*2/3*π) |
| 2 | 1 | exp(1*4/3*π) | 1 |

An element with an index of $X_m$ of each sequence in the sequence set $A_m$ is processed. For example, the element with an index of $X_m$ is multiplied by a specified value v to obtain a sequence set $B_m$, where m=0, 1 and 2, $X_0$, $X_1$, and $X_2$ are equal to 0, 1 and 2 respectively, and a value of v may be 0. That is, the element with an index of $X_0$=0 of each sequence in the sequence set $A_0$ is multiplied by the specified value v to obtain a sequence set $B_0$, the element with an index of $X_1$=1 of each sequence in the sequence set $A_1$ is multiplied by the specified value v to obtain a sequence set $B_1$, and the element with an index of $X_2$=2 of each sequence in the sequence set $A_2$ is multiplied by the specified value v to obtain a sequence set $B_2$.

The obtained sequence sets $B_m$ including $B_0$, $B_1$ and $B_2$ are combined into a sequence set C, and the sequence set C contains 9 sequences each having a length of 3.

In the embodiment, the sequence set C may also be acquired according to M=2 sequence sets $A_0$ and $A_1$, and each of these two sequence sets contains 2 sequences each having a length of 2, as shown in the tables 15 and 16.

TABLE 15

| Sequence index | Sequence element index and sequence element | |
|---|---|---|
| | 0 | 1 |
| 0 | 1 | 1 |
| 1 | 1 | −1 |

TABLE 16

| Sequence index | Sequence element index and sequence element | |
|---|---|---|
| | 0 | 1 |
| 0 | 1 | i |
| 1 | 1 | −i |

An element with an index of $X_m$ of each sequence in the sequence set $A_m$ is processed. For example, the element with an index of $X_m$ is multiplied by a specified value v to obtain a sequence set $B_m$, where m=0 and 1, $X_0$ and $X_1$ are equal to 0 and 1 respectively, and a value of v may be one of: ½*(sqrt(2)+sqrt(6)), ½*(sqrt(2)−sqrt(6)), −½*(sqrt(2)+sqrt(6)), −½*(sqrt(2)−sqrt(6)), ½*i*(sqrt(2)+sqrt(6)), ½*i*(sqrt(2)−sqrt(6)), −½*i*(sqrt(2)+sqrt(6)), or −½*i*(sqrt(2)−sqrt(6)). That is, the element with an index of $X_0$=0 of each sequence in the sequence set $A_0$ is multiplied by the specified value v to obtain a sequence set $B_0$, and the element with an index of $X_1$=1 of each sequence in the sequence set $A_1$ is multiplied by the specified value v to obtain a sequence set $B_1$.

The obtained sequence sets $B_m$ including $B_0$ and $B_1$ are combined into a sequence set C, and the sequence set C contains 4 sequences each with a length of 4.

The data processing method provided by the embodiment may acquire a sequence s from the sequence set C in a random selection manner, or according to system pre-configuration information, or according to a system signaling indicator, or according to a system preset rule.

Then, the method processes the data by using the acquired sequence s to generate the processed data.

According to the data processing method provided by the embodiment, when some specified values v are used, cross-correlation between any two different sequences in the generated sequence set C is equal; when other specified values v are used, cross-correlation between any two different sequences in the generated sequence set C is nearly equal.

In the embodiment, when the sequence set C is acquired according to multiple sequence sets, the multiple sequence sets may be multiple preset sequence sets, or may be multiple sequence sets obtained by splitting one sequence set.

In the embodiment, the sequence set C acquired in a specified manner may also be directly used as a system preset sequence set, and then the data processing method provided by the embodiment may directly acquire a sequence to be used from the preset sequence set, and process the data by using the acquired sequence to generate the processed data.

Embodiment 7

The embodiment provides a data processing method. In the embodiment, a sequence set C is first acquired according to M=4 sequence sets $A_0$, $A_1$, $A_2$ and $A_3$, and each of these four sequence sets contains 4 sequences each with a length of 4, as shown in the tables 17 to 20.

TABLE 17

| Sequence index | Sequence element index and sequence element | | | |
|---|---|---|---|---|
| | 0 | 1 | 2 | 3 |
| 0 | 1 | 1 | 1 | 1 |
| 1 | 1 | 1 | −1 | −1 |
| 2 | 1 | −1 | 1 | −1 |
| 3 | 1 | −1 | −1 | 1 |

TABLE 18

| Sequence index | Sequence element index and sequence element | | | |
|---|---|---|---|---|
| | 0 | 1 | 2 | 3 |
| 0 | 1 | 1 | 1i | −1i |
| 1 | 1 | 1 | −1i | 1i |
| 2 | 1 | 1 | 1i | 1i |
| 3 | 1 | −1 | 1i | −1i |

TABLE 19

| Sequence index | Sequence element index and sequence element | | | |
|---|---|---|---|---|
| | 0 | 1 | 2 | 3 |
| 0 | 1 | 1i | 1 | −1i |
| 1 | 1 | 1i | −1 | 1i |
| 2 | 1 | −1i | 1 | 1i |
| 3 | 1 | −1i | −1 | −1i |

TABLE 20

| Sequence index | Sequence element index and sequence element | | | |
|---|---|---|---|---|
| | 0 | 1 | 2 | 3 |
| 0 | 1 | 1i | 1i | −1 |
| 1 | 1 | 1i | −1i | 1 |
| 2 | 1 | −1i | 1i | 1 |
| 3 | 1 | −1i | −1i | −1 |

An element with an index of $X_m$ of each sequence in the sequence set $A_m$ is processed. For example, the element with an index of $X_m$ is multiplied by specified values v1 and v2 to obtain a sequence set $B1_m$ and a sequence set $B2_m$ respectively, and the sequence sets $B1_m$ and $B2_m$ are combined to form a sequence set $B_m$, where m=0, 1, 2 and 3. $X_0$, $X_1$, $X_2$, and $X_3$ are equal to 0, 2, 3 and 1 respectively. Values of v1 and v2 are a+ib and 2−a−ib respectively (for example, v1 is 2+i, and v2 is −i). Each of the sequence sets $B1_m$ and $B^2_m$ contains 4 sequences each with a length of 4, and the sequence set $B_m$ contains 4 sequences each with a length of 8. That is, the element with an index of $X_0$=0 of each sequence in the sequence set $A_0$ is multiplied by the specified values v1 and v2 to obtain sequence sets $B1_0$ and $B2_0$ respectively, and the sequence sets $B1_0$ and $B2_0$ are combined to obtain a sequence set $B_0$. Similarly, sequence sets $B_1$, $B_2$ and $B_3$ can be acquired.

The obtained sequence sets $B_m$ including $B_0$, $B_1$, $B_2$ and $B_3$ are combined into a sequence set C, and the sequence set C contains 16 sequences each with a length of 8.

The data processing method provided by the embodiment acquires a sequence to be used from the sequence set C, and processes the data by using the acquired sequence to generate the processed data.

In the embodiment, cross-correlation between any two different sequences in the acquired sequence set C is equal.

In the embodiment, when v1 and v2 take appropriate values (for example, v1 is −i, and v2 is 2+i), another sequence set containing 16 sequences each with a length of 8 may also be acquired, and cross-correlation between any two sequences is equal. By combining this sequence set and the above sequence set C, a sequence set containing 32 sequences each with a length of 8 can be acquired, and cross-correlation between any two sequences is equal.

In an optional embodiment, when values of v1 and v2 are i(a+ib) and i(2−a−ib) respectively and sequence sets $B1_m$ and $-B2_m$ are combined, other similar sequence sets may also be acquired. For example, when v1 is −1+2i and v2 is 1, a sequence set containing 16 sequences each with a length of 8 can be obtained; when v1 is 1 and v2 is −1+2i, another sequence set containing 16 sequences each with a length of 8 can also be obtained. By combining the two sequence sets each containing 16 length-8 sequences and the above sequence set containing 32 length-8 sequences, a sequence set containing 64 length-8 sequences can be obtained, and cross-correlation between any two sequences is equal.

In the embodiment, the sequence set acquired in a specified manner may also be directly used as a system preset sequence set, and then the data processing method provided by the embodiment may directly acquire a sequence to be used from the preset sequence set, and process the data by using the acquired sequence to generate the processed data.

Embodiment 8

The embodiment provides a data processing method. In the embodiment, a sequence set D is first acquired according to a sequence set A. The sequence set A is a Hadamard sequence set containing 4 sequences each with a length L of 4, and 4 sequence vectors each with a length of 4 in the sequence set may form a fourth-order Hadamard matrix, as shown in the table 21.

TABLE 21

| Sequence index | Sequence element index and sequence element | | | |
|---|---|---|---|---|
| | 0 | 1 | 2 | 3 |
| 0 | 1 | 1 | 1 | 1 |
| 1 | 1 | 1 | −1 | −1 |
| 2 | 1 | −1 | 1 | −1 |
| 3 | 1 | −1 | −1 | 1 |

A specified element in the sequence set A is processed. Specifically, an element −1 in the sequence set A is transformed into 1i (or is multiplied by −1i) to obtain a sequence set B, as shown in the table 22.

TABLE 22

| Sequence index | Sequence element index and sequence element | | | |
|---|---|---|---|---|
| | 0 | 1 | 2 | 3 |
| 0 | 1 | 1 | 1 | 1 |
| 1 | 1 | 1i | 1 | 1i |
| 2 | 1 | 1 | 1i | 1i |
| 3 | 1 | 1i | 1i | 1 |

A specified element in the sequence set B is processed. Specifically, the specified element in the sequence set B is multiplied by −1 or is negated to obtain a sequence set C, as shown in the table 23. The specified element includes the element with an index of 3 of the sequence with an index of 1, the element with an index of 3 of the sequence with an index of 2, and the element with an index of 3 of the sequence with an index of 3.

TABLE 23

| Sequence index | Sequence element index and sequence element | | | |
|---|---|---|---|---|
| | 0 | 1 | 2 | 3 |
| 0 | 1 | 1 | 1 | 1 |
| 1 | 1 | 1i | 1 | −1i |

TABLE 23-continued

| Sequence index | Sequence element index and sequence element | | | |
|---|---|---|---|---|
| | 0 | 1 | 2 | 3 |
| 2 | 1 | 1 | 1i | −1i |
| 3 | 1 | 1i | 1i | −1 |

Furthermore, the sequence set D is obtained according to the sequence set A and the sequence set C. For example, all sequences obtained by sequentially performing dot product between each sequence in the sequence set A and each sequence in the sequence set C form the sequence set D, as shown in the table 24.

TABLE 24

| Sequence index | Sequence element index and sequence element | | | |
|---|---|---|---|---|
| | 0 | 1 | 2 | 3 |
| 0 | 1 | 1 | 1 | 1 |
| 1 | 1 | 1 | −1 | −1 |
| 2 | 1 | −1 | 1 | −1 |
| 3 | 1 | −1 | −1 | 1 |
| 4 | 1 | 1i | 1 | −1i |
| 5 | 1 | 1i | −1 | 1i |
| 6 | 1 | −1i | 1 | 1i |
| 7 | 1 | −1i | −1 | −1i |
| 8 | 1 | 1 | 1i | −1i |
| 9 | 1 | 1 | −1i | 1i |
| 10 | 1 | −1 | 1i | 1i |
| 11 | 1 | −1 | −1i | −1i |
| 12 | 1 | 1i | 1i | −1 |
| 13 | 1 | 1i | −1i | 1 |
| 14 | 1 | −1i | 1i | 1 |
| 15 | 1 | −1i | −1i | −1 |

A sequence $s_1$ is acquired from the sequence set D. Assumed that the index of the acquired sequence $s_1$ is 5, the sequence $s_1$ is [1, 1i, −1, $1_i$].

A sequence element to be processed in the sequence s1 is acquired. In the embodiment, the sequence element to be processed is acquired according to an association relationship or a correspondence between the sequence index and a specified sequence element index. Specifically, a value set of the specified sequence element index is {0, 3, 2, 11}, and an index of the sequence element to be processed is acquired from the value set of the specified sequence element index according to floor(sequence index/sequence length)+1. Since the index of the sequence s1 is 5, the index of the sequence element to be processed is 3.

An element with an index of 3 in the sequence s1 is processed. Specifically, the element with an index of 3 in the sequence s1 is multiplied by a specified value v to generate a sequence s2. In the embodiment, a value of v is 2, and then the sequence s2 is [1, 1i, −1, 2*1i].

Then in the embodiment, the data is processed by using the sequence s2 to generate the processed data.

In the embodiment, the sequence set A may be a Walsh sequence set.

In the embodiment, the sequence set C may also be used as a preset sequence set. The sequence set D is obtained according to the sequence set A and this preset sequence set, then the sequence s1 is acquired from the sequence set D, the sequence element to be processed is acquired from the sequence s1 and is further processed to obtain the sequence s2, and the data is processed by using the sequence s2.

According to the embodiment, 4 sequence sets (M=4) shown in tables 8 to 11 and 4 sequence sets (M=4) shown in tables 17 to 20 may also be obtained by using a method similar to the method in the embodiment, that is, 4 sequence sets are obtained according to the sequence set A, or 4 sequence sets are obtained according to the sequence set A and the preset sequence set C. Specifically, 4 sequences obtained by sequentially performing dot product between each sequence in the sequence set A and a sequence with an index of 0 in the sequence set C may be used as the sequence set $A_0$ shown in the table 8, and similarly, other sequence sets $A_1$, $A_2$ and $A_3$ can also be obtained. Similarly, 3 sequence sets (M=3) shown in tables 12 to 14 and 2 sequence sets (M=2) shown in tables 15 and 16 may also be obtained by using a method similar to the method in the embodiment.

Embodiment 9

The embodiment provides a data processing method. In the embodiment, a sequence set A is a preset sequence set, such as the sequence set shown in the table 25.

TABLE 25

| | Sequence element index and sequence element | |
|---|---|---|
| Sequence index | 0 | 1 |
| 0 | 1 | 0 |
| 1 | −1/sqrt(3) | sqrt(2/3) |

TABLE 25-continued

| | Sequence element index and sequence element | |
|---|---|---|
| Sequence index | 0 | 1 |
| 2 | −1/sqrt(3) | sqrt(2/3)*exp(i*2/3*π) |
| 3 | −1/sqrt(3) | sqrt(2/3)*exp(i*4/3*π) |

The sequence set A may also be the sequence set shown in the table 26.

TABLE 26

| | Sequence element index and sequence element | | |
|---|---|---|---|
| Sequence index | 0 | 1 | 2 |
| 0 | 1 | 0 | 0 |
| 1 | −1/2 | sqrt(3)/2*1i | 0 |
| 2 | −1/2 | −sqrt(3)/2*1i | 0 |
| 3 | −1/2 | 1/2 | sqrt(1/2) |
| 4 | −1/2 | 1/2 | sqrt(1/2)*exp(i*2/3*π) |
| 5 | −1/2 | 1/2 | sqrt(1/2)*exp(i*4/3*π) |
| 6 | −1/2 | −1/2 | sqrt(1/2) |
| 7 | −1/2 | −1/2 | sqrt(1/2)*exp(i*2/3*π) |
| 8 | −1/2 | −1/2 | sqrt(1/2)*exp(i*4/3*π) |

The sequence set A may also be the sequence set shown in the table 27.

TABLE 27

| | Sequence element index and sequence element | | | | | | | |
|---|---|---|---|---|---|---|---|---|
| Sequence index | 0 | 1 | 2 | 3 | 4 | 5 | 6 | 7 |
| 0 | 0 | 0 | 1 + 1i | 1 − 1i | 1 + 1i | −1 − 1i | 0 | 2 |
| 1 | 0 | 0 | 1 − 1i | 1 + 1i | −1 − 1i | 1 + 1i | 2 | 0 |
| 2 | 0 | 0 | 1 + 1i | −1 + 1i | 1 + 1i | 1 + 1i | 0 | −2 |
| 3 | 0 | 0 | −1 + 1i | 1 + 1i | 1 + 1i | 1 + 1i | −2 | 0 |
| 4 | 1 + 1i | 1 − 1i | 0 | 0 | 0 | 2 | 1 + 1i | −1 − 1i |
| 5 | 1 − 1i | 1 + 1i | 0 | 0 | 2 | 0 | −1 − 1i | 1 + 1i |
| 6 | 1 + 1i | −1 + 1i | 0 | 0 | 0 | −2 | 1 + 1i | 1 + 1i |
| 7 | −1 + 1i | 1 + 1i | 0 | 0 | −2 | 0 | 1 + 1i | 1 + 1i |
| 8 | 0 | 0 | −1 − 1i | −1 + 1i | 1 + 1i | −1 − 1i | 0 | −2 |
| 9 | 0 | 0 | −1 + 1i | −1 − 1i | −1 − 1i | 1 + 1i | −2 | 0 |
| 10 | 0 | 0 | −1 − 1i | 1 − 1i | 1 + 1i | 1 + 1i | 0 | 2 |
| 11 | 0 | 0 | 1 − 1i | −1 − 1i | 1 + 1i | 1 + 1i | 2 | 0 |
| 12 | −1 − 1i | −1 + 1i | 0 | 0 | 0 | −2 | 1 + 1i | −1 − 1i |
| 13 | −1 + 1i | −1 − 1i | 0 | 0 | −2 | 0 | −1 − 1i | 1 + 1i |
| 14 | −1 − 1i | 1 − 1i | 0 | 0 | 0 | 2 | 1 + 1i | 1 + 1i |
| 15 | 1 − 1i | −1 − 1i | 0 | 0 | 2 | 0 | 1 + 1i | 1 + 1i |
| 16 | 1 + 1i | −1 − 1i | 0 | 2 | 0 | 0 | 1 + 1i | 1 − 1i |
| 17 | −1 − 1i | 1 + 1i | 2 | 0 | 0 | 0 | 1 − 1i | 1 + 1i |
| 18 | 1 + 1i | 1 + 1i | 0 | −2 | 0 | 0 | 1 + 1i | −1 + 1i |
| 19 | 1 + 1i | 1 + 1i | −2 | 0 | 0 | 0 | −1 + 1i | 1 + 1i |
| 20 | 0 | 2 | 1 + 1i | −1 − 1i | 1 + 1i | 1 − 1i | 0 | 0 |
| 21 | 2 | 0 | −1 − 1i | 1 + 1i | 1 − 1i | 1 + 1i | 0 | 0 |
| 22 | 0 | −2 | 1 + 1i | 1 + 1i | 1 + 1i | −1 + 1i | 0 | 0 |
| 23 | −2 | 0 | 1 + 1i | 1 + 1i | −1 + 1i | 1 + 1i | 0 | 0 |
| 24 | 1 + 1i | −1 − 1i | 0 | −2 | 0 | 0 | −1 − 1i | −1 + 1i |
| 25 | −1 − 1i | 1 + 1i | −2 | 0 | 0 | 0 | −1 + 1i | −1 − 1i |
| 26 | 1 + 1i | 1 + 1i | 0 | 2 | 0 | 0 | −1 − 1i | 1 − 1i |
| 27 | 1 + 1i | 1 + 1i | 2 | 0 | 0 | 0 | 1 − 1i | −1 − 1i |
| 28 | 0 | −2 | 1 + 1i | −1 − 1i | −1 − 1i | −1 + 1i | 0 | 0 |
| 29 | −2 | 0 | −1 − 1i | 1 + 1i | −1 + 1i | −1v1i | 0 | 0 |
| 30 | 0 | 2 | 1 + 1i | 1 + 1i | −1 − 1i | 1 − 1i | 0 | 0 |
| 31 | 2 | 0 | 1 + 1i | 1 + 1i | 1 − 1i | −1 − 1i | 0 | 0 |
| 32 | 0 | 0 | 1 + 1i | 1 − 1i | −1 − 1i | 1 + 1i | 0 | −2 |
| 33 | 0 | 0 | 1 − 1i | 1 + 1i | 1 + 1i | −1v1i | −2 | 0 |
| 34 | 0 | 0 | 1 + 1i | −1 + 1i | −1 − 1i | −1v1i | 0 | 2 |
| 35 | 0 | 0 | −1 + 1i | 1 + 1i | −1 − 1i | −1 − 1i | 2 | 0 |
| 36 | 1 + 1i | 1 − 1i | 0 | 0 | 0 | −2 | −1 − 1i | 1 + 1i |
| 37 | 1 − 1i | 1 + 1i | 0 | 0 | −2 | 0 | 1 + 1i | −1v1i |
| 38 | 1 + 1i | −1 + 1i | 0 | 0 | 0 | 2 | −1 − 1i | −1 − 1i |
| 39 | −1 + 1i | 1 + 1i | 0 | 0 | 2 | 0 | −1 − 1i | −1v1i |
| 40 | 0 | 0 | −1 − 1i | v1 + 1i | −1 − 1i | 1 + 1i | 0 | 2 |
| 41 | 0 | 0 | −1 + 1i | −1 − 1i | 1 + 1i | −1 − 1i | 2 | 0 |

TABLE 27-continued

| | Sequence element index and sequence element | | | | | | | |
|---|---|---|---|---|---|---|---|---|
| Sequence index | 0 | 1 | 2 | 3 | 4 | 5 | 6 | 7 |
| 42 | 0 | 0 | −1 − 1i | 1 − 1i | −1 − 1i | −1 − 1i | 0 | −2 |
| 43 | 0 | 0 | 1 − 1i | −1 − 1i | −1 − 1i | −1 − 1i | −2 | 0 |
| 44 | −1 − 1i | −1 + 1i | 0 | 0 | 0 | 2 | −1 − 1i | 1 + 1i |
| 45 | −1 + 1i | −1 − 1i | 0 | 0 | 2 | 0 | 1 + 1i | −1 − 1i |
| 46 | −1 − 1i | 1 − 1i | 0 | 0 | 0 | −2 | −1 − 1i | −1 − 1i |
| 47 | 1 − 1i | −1 − 1i | 0 | 0 | −2 | 0 | −1 − 1i | −1 − 1i |
| 48 | −1 − 1i | 1 + 1i | 0 | −2 | 0 | 0 | 1 + 1i | 1 − 1i |
| 49 | 1 + 1i | −1 − 1i | −2 | 0 | 0 | 0 | 1 − 1i | 1 + 1i |
| 50 | −1 − 1i | −1 − 1i | 0 | 2 | 0 | 0 | 1 + 1i | −1 + 1i |
| 51 | −1 − 1i | −1 − 1i | 2 | 0 | 0 | 0 | −1 + 1i | 1 + 1i |
| 52 | 0 | −2 | −1 − 1i | 1 + 1i | 1 + 1i | 1 − 1i | 0 | 0 |
| 53 | −2 | 0 | 1 + 1i | −1 − 1i | 1 − 1i | 1 + 1i | 0 | 0 |
| 54 | 0 | 2 | −1 − 1i | −1 − 1i | 1 + 1i | −1 + 1i | 0 | 0 |
| 55 | 2 | 0 | −1 − 1i | −1 − 1i | −1 + 1i | 1 + 1i | 0 | 0 |
| 56 | −1 − 1i | 1 + 1i | 0 | 2 | 0 | 0 | −1 − 1i | −1 + 1i |
| 57 | 1 + 1i | −1 − 1i | 2 | 0 | 0 | 0 | −1 + 1i | −1 − 1i |
| 58 | −1 − 1i | −1 − 1i | 0 | −2 | 0 | 0 | −1 − 1i | 1 − 1i |
| 59 | −1 − 1i | −1 − 1i | −2 | 0 | 0 | 0 | 1 − 1i | −1 − 1i |
| 60 | 0 | 2 | −1 − 1i | 1 + 1i | −1 − 1i | −1 + 1i | 0 | 0 |
| 61 | 2 | 0 | 1 + 1i | −1 − 1i | −1 + 1i | −1 − 1i | 0 | 0 |
| 62 | 0 | −2 | −1 − 1i | −1 − 1i | −1 − 1i | 1 − 1i | 0 | 0 |
| 63 | −2 | 0 | −1 − 1i | −1 − 1i | 1 − 1i | −1 − 1i | 0 | 0 |

The data processing method provided by the embodiment acquires a sequence s from the sequence set A, and processes the data by using the acquired sequence s to generate the processed data.

In the embodiment, cross-correlation between any two different sequences in the preset sequence set A is equal.

It is to be noted that, in the sequence set of each embodiment described above, the order of the sequences may be different from the order shown in the above table, and the order of the sequence elements may also be different from the order shown in the above table.

From the description of the above embodiment, it will be apparent to those skilled in the art that the method in the embodiments described above may be implemented by software plus a necessary general-purpose hardware platform, or may of course be implemented by hardware. However, in many cases, the former is a preferred implementation manner. Based on this understanding, the solutions provided by the present disclosure substantially, or the part contributing to the related art, may be embodied in the form of a software product. The computer software product is stored in a storage medium (such as a read only memory (ROM)/random access memory (RAM), a magnetic disk or an optical disk) and includes several instructions for enabling a terminal device (which may be a mobile phone, a computer, a server, a network device or the like) to execute the method according to each embodiment of the present disclosure.

An embodiment of the present disclosure further provides a data processing apparatus. The apparatus is configured to implement the above-mentioned embodiments, and what has been described will not be repeated. As used below, the term "module" may be software, hardware or a combination thereof capable of implementing predetermined functions. The device in the embodiment described below is preferably implemented by software, but implementation by hardware or by a combination of software and hardware is also possible and conceived.

Figure 5:
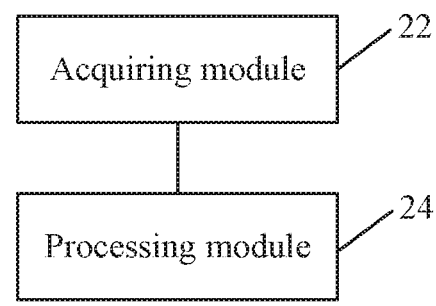
FIG. 5 is a structural block diagram of a data processing apparatus according to an embodiment of the present disclosure.

FIG. 5 is a structural block diagram of a data processing apparatus according to an embodiment of the present disclosure. As shown in FIG. 5, the apparatus includes an acquiring module 22 and a processing module 24.

The acquiring module 22 is configured to acquire a first sequence. The first sequence includes one of: a sequence obtained by processing a first specified element of a second sequence, or a sequence acquired from a first sequence set, and the first sequence set includes one of: a sequence set obtained by processing M sequence sets, or a preset first sequence set.

The processing module 24 is connected to the acquiring module 22 and is configured to process first data by using the first sequence; where M is an integer greater than or equal to 1.

Through the above apparatus, since the used first sequence is obtained by processing a first specified element of a second sequence or is acquired from a first sequence set, where the first sequence set may be a sequence set obtained by processing M sequence sets or a preset first sequence set, the problem of the design of codes or sequences in the related art can be solved. The sequence obtained through the embodiments of the present application can be used for implementing the grant-free transmission and non-orthogonal multiple access with good performance and efficiency.

It is to be noted that the second sequence may be one of: a Hadamard sequence of a length L, a sequence of a length L acquired according to a Hadamard sequence generation method, a Walsh sequence of a length L, a sequence of a length L acquired according to a Walsh sequence generation method, a sequence of a length L acquired from a second sequence set, or a sequence whose element values are from a candidate value set, where L is an integer greater than 1.

It is to be noted that the second sequence set includes one of: a Hadamard matrix, a Hadamard sequence set, a Walsh sequence set, a preset second sequence set, or a sequence set obtained according to at least one of: a Hadamard matrix, a Hadamard sequence set, a Walsh sequence set, or a third sequence set, The Hadamard matrix contains L vectors each having a length L, the Hadamard sequence set contains L sequences each having a length L, and the Walsh sequence set contains L sequences each having a length L.

In one embodiment of the present disclosure, in a case where the second sequence is the sequence whose element values are from the candidate value set, a value of a second specified element of the second sequence is a preset value, the preset value is from the candidate value set, and a value of a third specified element of the second sequence is a value acquired from the candidate value set according to a first specified manner. The second specified element includes: an element indicated by an index preset by a system, or an element determined according to a system preset rule. The third specified element includes: an element indicated by an index preset by a system, or an element determined according to a system preset rule. The first specified manner includes one of: a random selection manner, system configuration information, or a system preset rule.

It is to be noted that the candidate value set includes one of: {1, 1i, −1, −1i}, {1, exp(1i*⅔*π), exp(1i*4/3*π)}, where i is an imaginary unit and is equal to sqrt(−1), and sqrt( ) is a square root operation.

In one embodiment of the present disclosure, the acquiring module may further be configured to acquire the first specified element according to one of following manners: acquiring the first specified element in a random selection manner, acquiring the first specified element according to system configuration information, acquiring the first specified element according to a system preset rule, or acquiring the first specified element according to information of the second sequence, where the first specified element contains at least one element, and the information of the second sequence includes: index information of the second sequence, or index information of a sequence set to which the second sequence belongs.

In one embodiment of the present disclosure, in a case where the first sequence includes the sequence obtained by processing the first specified element of the second sequence, the acquiring module 22 may further configured to execute at least one of following functions: taking a sequence obtained by multiplying the first specified element of the second sequence by a first specified value as the first sequence; multiplying the first specified element of the second sequence by a second specified value and a third specified value respectively to obtain two sequences, combining the two obtained sequences in a second specified manner to form one sequence, and using the one combined sequence as the first sequence; or taking a sequence, which is obtained by determining a value of the first specified element of the second sequence according to a fourth specified element of the second sequence, as the first sequence, where the fourth specified element includes: an element indicated by an index preset by a system, or an element determined according to a system preset rule.

It is to be noted that the first specified value may include one of: 0, −1+2i, −1−2i, 2, −2, 2i, −2i, 2+1/16, −(2+1/16), (2+1/16)*1i, −(2+1/16)*1i, 2+1/32, −(2+1/32), (2+1/32)*1i, −(2+1/32)*1i, sqrt(2+sqrt(5)), −sqrt(2+sqrt(5)), sqrt(2+sqrt(5))*1i, −sqrt(2+sqrt(5))*1i; ½*(sqrt(2)+sqrt(6)), ½*(sqrt(2)−sqrt(6)), −½*(sqrt(2)+sqrt(6)), −½*(sqrt(2)−sqrt(6)), ½*1i*(sqrt(2)+sqrt(6)), ½*1i*(sqrt(2)−sqrt(6)), −½*1i*(sqrt(2)+sqrt(6)), −½*1i*(sqrt(2)−sqrt(6)); 1+sqrt(3)*1i, 1−sqrt(3)*1i, ½*(1+sqrt(3))*(1+1i), ½*(1−sqrt(3))*(1+1i), ½*(1+sqrt(3))*(1−1i), ½*(1−sqrt(3))*(1−1i), −½*(1+sqrt(3))*(1+1i), −½*(1−sqrt(3))*(1+1i), −½*(1+sqrt(3))*(1−1i), −½*(1−sqrt(3))*(1−1i), a+ib; where a and b are real numbers, i is an imaginary unit and is equal to sqrt(−1), and sqrt( ) is a square root operation.

In one embodiment of the present disclosure, the second specified value is c+id, and the third specified value is 2−c−id; or the second specified value is (c+id)*1i, and third specified value is (2−c−id)*1i; where c and d are real numbers, and i is an imaginary unit and is equal to sqrt(−1), and sqrt(is a square root operation.

It is to be noted that the M sequence sets may include one of: one Hadamard matrix, one Hadamard sequence set, one Walsh sequence set, M preset sequence sets, M sequence sets obtained according to at least one of: a Hadamard matrix, a Hadamard sequence set, a Walsh sequence set, or a fourth sequence set, or M sequence sets obtained by splitting one sequence set. The Hadamard matrix contains L vectors each having a length L, the Hadamard sequence set contains L sequences each having a length L, and the Walsh sequence set contains L sequences each having a length L, where L is an integer greater than 1.

It is to be noted that in a case where the first sequence set includes the sequence set obtained by processing M sequence sets, the acquiring module 22 may further include: a processing unit, which is configured to process the M sequence set in one of following manners, and takes the obtained sequence set as the first sequence set.

In a case where the M sequence sets are one sequence set, an element with an index of X of each sequence of the one sequence set is multiplied a fourth specified value to obtain a sequence set $B_X$, where 0≤X≤L1−1, X is an integer, and L1 is a sequence length of the each sequence; and the one sequence set contains N1 sequences, where N1 is an integer greater than or equal to 1.

The obtained sequence sets $B_X$ are combined to form the first sequence set, where the first sequence set contains N1×L1 sequences each having a length L1.

An element with an index of Y of each sequence of a sequence set with an index of m in the M sequence sets is multiplied by a fifth specified value to obtain a sequence set $B_m$, where 0≤m≤M−1, m is an integer, 0≤Y≤L2−1, Y is an integer, and L2 is a sequence length of the each sequence; and each sequence set in the M sequence sets contains N2 sequences, where N2 is an integer greater than or equal to 1. The obtained sequence sets $B_m$ are combined to form the first sequence set, where the first sequence set contains N2×M sequences each having a length L2.

An element with an index of Z of each sequence of a sequence set with an index of m in the M sequence sets is multiplied by a sixth specified value and a seventh specified value respectively to obtain a sequence set $C_m$ and a sequence set $D_m$, and the obtained sequence set $C_m$ and the obtained sequence set $D_m$ are combined in a third specified manner to form a sequence set $E_m$, where 0≤m≤M−1, m is an integer, 0≤Z≤L3−1, Z is an integer, and L3 is a sequence length of the each sequence; each sequence set in the M sequence sets contains N3 sequences, where N3 is an integer greater than or equal to 1; and the sequence set $E_m$ contains N3 sequences each having a length L3×2. The obtained sequence sets $E_m$ are combined to form the first sequence set, where the first sequence set contains N3×M sequences each having a length L3×2.

In one embodiment of the present disclosure, in a case where the first sequence is the sequence acquired from the first sequence set, the acquiring module 22 may further configured to acquire the first sequence from the first sequence set according to a fourth specified manner; where the fourth specified manner includes at least one of: a random selection manner, system configuration information, or a system preset rule.

In one embodiment of the present disclosure, the processing module 24 may further be configured to perform specified processing on the first data by using the first sequence; where the specified processing includes at least one of: spreading processing, mapping processing, modulation processing, de-spreading processing, de-mapping processing, demodulation processing, or system preset processing.

It is to be noted that the above apparatus may, but may not necessarily, be located in device, such as a terminal or a base station.

The embodiments of the present disclosure further provide a device. The device includes a memory, a processor and a computer program stored in the memory and executable by the processor, where when executing the computer program, the processor implements the method according to any one of the embodiments described above.

It is to be noted that the various modules described above may be implemented by software or hardware. Implementation by hardware may, but may not necessarily, be performed in the following manners: the various modules described above are located in the same processor, or the various modules described above are located in their respective processors in any combination form.

The embodiments of the present disclosure further provide a storage medium. The storage medium includes a stored program which, when executed, executes the method according to any one of the embodiments described above.

Optionally, in the embodiment, the storage medium may include, but is not limited to, a USB flash disk, a ROM, a RAM, a mobile hard disk, a magnetic disk, an optical disk or various other media capable of storing program codes.

The embodiments of the present disclosure further provide a processor. The processor is configured to execute a program which, when executed, executed the method according to any one of the embodiments described above.

Optionally, for specific examples in the embodiment, reference may be made to the examples described in the above embodiments, and the examples will not be repeated in the embodiment.

Apparently, it should be understood by those skilled in the art that each of the above-mentioned modules or steps of the present disclosure may be implemented by a general-purpose computing device, the modules or steps may be concentrated on a single computing device or distributed on a network composed of multiple computing devices, and alternatively, the modules or steps may be implemented by program codes executable by the computing devices, so that the modules or steps may be stored in a storage device and executed by the computing device. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

INDUSTRIAL APPLICABILITY

In the embodiments of the present disclosure, since the used first sequence is obtained by processing a first specified element of a second sequence or is acquired from a first sequence set, where the first sequence set may be a sequence set obtained by processing M sequence sets or a preset first sequence set, the problem of the design of codes or sequences in the related art can be solved. The sequence obtained through the technical solution of the embodiments of the present disclosure can at least be used for implementing the grant-free transmission and non-orthogonal multiple access with good performance and efficiency.

What is claimed is:

1. A data processing method, comprising:

acquiring a first sequence, wherein the first sequence comprises: a sequence obtained by processing a first specified element of a second sequence of a length L, or a sequence acquired from a first sequence set, wherein the first sequence set is obtained by processing M sequence sets; and performing specified processing on first data by using the first sequence, wherein the specified processing comprises: spreading processing, or mapping processing, or modulation processing;

wherein M is an integer greater than or equal to 1, and L is an integer greater than 1;

wherein in a case where the first sequence comprises the sequence obtained by processing the first specified element of the second sequence of a length L, acquiring the first sequence comprises:

multiplying the first specified element of the second sequence by a first specified value to obtain the first sequence, wherein the first specified value comprises one of: 0, $-1+2i$, $-1-2i$, 2, $-2$, $2i$, $-2i$, $2+\frac{1}{16}$, $-(2+\frac{1}{16})$, $(2+\frac{1}{16})*1i$, $-(2+\frac{1}{16})*1i$, $2+\frac{1}{32}$, $-(2+\frac{1}{32})$, $(2+\frac{1}{32})*1i$, $-(2+\frac{1}{32})*1i$, $\text{sqrt}(2+\text{sqrt}(5))$, $-\text{sqrt}(2+\text{sqrt}(5))$, $\text{sqrt}(2+\text{sqrt}(5))*1i$, $-\text{sqrt}(2+\text{sqrt}(5))*1i$; $\frac{1}{2}*(\text{sqrt}(2)+\text{sqrt}(6))$, $\frac{1}{2}*(\text{sqrt}(2)-\text{sqrt}(6))$, $-\frac{1}{2}*(\text{sqrt}(2)+\text{sqrt}(6))$, $-\frac{1}{2}*(\text{sqrt}(2)-\text{sqrt}(6))$, $\frac{1}{2}*1i*(\text{sqrt}(2)+\text{sqrt}(6))$, $\frac{1}{2}*1i*(\text{sqrt}(2)-\text{sqrt}(6))$, $-\frac{1}{2}*1i*(\text{sqrt}(2)+\text{sqrt}(6))$, $-\frac{1}{2}*11*(\text{sqrt}(2)-\text{sqrt}(6))$; $1+\text{sqrt}(3)*1i$, $1-\text{sqrt}(3)*1i$, $\frac{1}{2}*(1+\text{sqrt}(3))*(1+10$, $\frac{1}{2}*(1-\text{sqrt}(3))*(1+1i)$, $\frac{1}{2}*(1+\text{sqrt}(3))*(1-10$, $\frac{1}{2}*(1-\text{sqrt}(3))*(1-1i)$, $-\frac{1}{2}*(1+\text{sqrt}(3))*(1+10$, $-\frac{1}{2}*(1-\text{sqrt}(3))*(1+10$, $-\frac{1}{2}*(1+\text{sqrt}(3))*(1-1i)$, $-\frac{1}{2}*(1-\text{sqrt}(3))*(1-1i)$, $a+ib$; where a and b are real numbers, i is an imaginary unit and is equal to $\text{sqrt}(-1)$, and $\text{sqrt}(\ )$ is a square root operation;

wherein in a case where the first sequence set is obtained by processing M sequence sets, the first sequence set is acquired in one of following manners:

in a case where the M sequence sets are one sequence set, multiplying an element with an index of X of each sequence of the one sequence set by a fourth specified value to obtain a sequence set $B_X$, wherein $0 \leq X \leq L1-1$, X is an integer, and L1 is a sequence length of the each sequence; and the one sequence set contains N1 sequences, wherein N1 is an integer greater than or equal to 1; and combining the obtained sequence sets $B_X$ to form the first sequence set, wherein the first sequence set contains N1×L1 sequences each having a length L1;

multiplying an element with an index of Y of each sequence of a sequence set with an index of m in the M sequence sets by a fifth specified value to obtain a sequence set $B_m$, wherein $0 \leq m \leq M-1$, m is an integer, $0 \leq X \leq L2-1$, Y is an integer, and L2 is a sequence length of the each sequence; and each sequence set in the M sequence sets contains N2 sequences, wherein N2 is an integer greater than or equal to 1; and combining the obtained sequence sets $B_m$ to form the first sequence set, wherein the first sequence set contains N2×M sequences each having a length L2; or multiplying an element with an index of Z of each sequence of a sequence set with an index of m in the M sequence sets by a sixth specified value and a seventh specified value respectively to obtain a sequence set $C_m$ and a sequence set $D_m$, and combining the obtained sequence sets $C_m$ and the obtained sequence sets $D_m$ in a specified manner to form a sequence set $E_m$, wherein $0 \leq m \leq M-1$, m is an integer, $0 \leq X \leq L2-1$, Z is an integer, and L3 is a sequence length of the each sequence; each sequence set in the M sequence sets contains N3 sequences, wherein N3 is an integer greater than or equal to 1; and the sequence set $E_m$ contains N3 sequences each of a length L3×2; and combining the obtained sequence sets $E_m$ to form the first sequence set, wherein the first sequence set contains N3×M sequences each having a length L3×2.

2. The method of claim 1, wherein the second sequence is:
a Hadamard sequence; or
a Walsh sequence.

3. The method of claim 1, wherein the second sequence is a sequence acquired from a second sequence set, and the second sequence set is obtained according to a Hadamard sequence set or a Walsh sequence set.

4. The method of claim 1, wherein the first specified element is acquired in a random selection manner.

5. The method of claim 1, wherein the M sequence sets comprise:
one Hadamard sequence set; or
one Walsh sequence set.

6. The method of claim 1, wherein in a case where the first sequence is the sequence acquired from the first sequence set,
acquiring the first sequence from the first sequence set according to a random selection manner.

7. The method of claim 1, further comprising:
cross-correlation between any two sequences in the first sequence set being equal or nearly equal.

8. A device, comprising a memory, a processor, and a computer program stored in the memory and executable by the processor, wherein when executing the computer program, the processor implements the data processing method according to claim 1.

9. The method of claim 1, wherein the second sequence is a sequence whose element values are from a candidate value set, wherein the candidate value set is {1, 1i, −1, −1i}, or {1, exp(i*2/3*π), exp(i*4/3*π)}.

10. The method of claim 9, wherein the second sequence being the sequence whose element values are from the candidate value set comprises: a value of a second specified element of the second sequence is a preset value, which is from the candidate value set, and a value of a third specified element of the second sequence is a value acquired from the candidate value set according to a first specified manner;
wherein the second specified element comprises: an element indicated by an index preset by a system, or an element determined according to a system preset rule; the third specified element comprises: an element indicated by an index preset by a system, or an element determined according to a system preset rule; and the first specified manner comprises one of: a random selection manner, system configuration information, or a system preset rule.

11. The method of claim 1, wherein the first specified element is acquired according to information of the second sequence, wherein the information of the second sequence comprises: index information of the second sequence, or index information of a sequence set to which the second sequence belongs.

12. The method of claim 1, wherein the M sequence sets comprise: M sequence sets obtained according to a Hadamard sequence set or a Walsh sequence set, or M sequence sets obtained with element values being from a candidate value set, wherein the candidate value set is {1, 1i, −1, −1i, or {1, exp(i*2/3*π), exp(i*4/3*π)}.

13. A data processing method, comprising:
acquiring a first sequence, wherein the first sequence comprises: a sequence obtained by processing a first specified element of a second sequence of a length L, or a sequence acquired from a first sequence set, wherein the first sequence set is obtained by processing M sequence sets; and
performing specified processing on first data by using the first sequence, wherein the specified processing comprises: spreading processing, or mapping processing, or modulation processing;
wherein M is an integer greater than or equal to 1, and L is an integer greater than 1,
wherein in a case where the first sequence comprises the sequence obtained by processing the first specified element of the second sequence of a length L, acquiring the first sequence comprises: multiplying the first specified element of the second sequence by a second specified value and a third specified value respectively to obtain two sequences, combining the two obtained sequences to obtain the first sequence;
wherein in a case where the first sequence set is obtained by processing M sequence sets, the first sequence set is acquired in one of following manners:
in a case where the M sequence sets are one sequence set, multiplying an element with an index of X of each sequence of the one sequence set by a fourth specified value to obtain a sequence set $B_X$, wherein 0≤X≤L1−1, X is an integer, and L1 is a sequence length of the each sequence; and the one sequence set contains N1 sequences, wherein N1 is an integer greater than or equal to 1; and combining the obtained sequence sets $B_X$ to form the first sequence set, wherein the first sequence set contains N1×L1 sequences each having a length L1;
multiplying an element with an index of Y of each sequence of a sequence set with an index of m in the M sequence sets by a fifth specified value to obtain a sequence set $B_m$, wherein 0≤m≤M−1, m is an integer, 0≤Y≤L2−1, Y is an integer, and L2 is a sequence length of the each sequence; and each sequence set in the M sequence sets contains N2 sequences, wherein N2 is an integer greater than or equal to 1; and combining the obtained sequence sets $B_m$ to form the first sequence set, wherein the first sequence set contains N2×M sequences each having a length L2; or
multiplying an element with an index of Z of each sequence of a sequence set with an index of m in the M sequence sets by a sixth specified value and a seventh specified value respectively to obtain a sequence set $C_m$ and a sequence set $D_m$, and combining the obtained sequence sets $C_m$ and the obtained sequence sets $D_m$ in a specified manner to form a sequence set $E_m$, wherein 0≤m≤M−1, m is an integer, 0≤Z≤L3−1, Z is an integer, and L3 is a sequence length of the each sequence; each sequence set in the M sequence sets contains N3 sequences, wherein N3 is an integer greater than or equal to 1; and the sequence set $E_m$ contains N3 sequences each of a length L3×2; and combining the obtained sequence sets $E_m$ to form the first sequence set, wherein the first sequence set contains N3×M sequences each having a length L3×2.

14. The method of claim 13, wherein
the second specified value is c+id, and the third specified value is 2−c−id; or
the second specified value is (c+id)*1i, and the third specified value is (2−c−id)*1i;

wherein c and d are real numbers, and i is an imaginary unit and is equal to sqrt(−1), and sqrt( ) is a square root operation.

15. A device, comprising a memory, a processor, and a computer program stored in the memory and executable by the processor, wherein when executing the computer program, the processor implements the data processing method according to claim 13.

16. The method of claim 1, A data processing method, comprising:
acquiring a first sequence, wherein the first sequence comprises: a sequence obtained by processing a first specified element of a second sequence of a length L, or a sequence acquired from a first sequence set, wherein the first sequence set is obtained by processing M sequence sets; and
performing specified processing on first data by using the first sequence, wherein the specified processing comprises: spreading processing, or mapping processing, or modulation processing;
wherein M is an integer greater than or equal to 1, and L is an integer greater than 1;
wherein in a case where the first sequence comprises the sequence obtained by processing the first specified element of the second sequence of a length L, acquiring the first sequence comprises: determining a value of the first specified element of the second sequence according to a fourth specified element of the second sequence to obtain the first sequence;
wherein in a case where the first sequence set is obtained by processing M sequence sets, the first sequence set is acquired in one of following manners:
in a case where the M sequence sets are one sequence set, multiplying an element with an index of X of each sequence of the one sequence set by a fourth specified value to obtain a sequence set $B_X$, wherein $0 \leq X \leq L1-1$, X is an integer, and L1 is a sequence length of the each sequence; and the one sequence set contains N1 sequences, wherein N1 is an integer greater than or equal to 1; and combining the obtained sequence sets $B_X$ to form the first sequence set, wherein the first sequence set contains N1×L1 sequences each having a length L1;
multiplying an element with an index of Y of each sequence of a sequence set with an index of m in the M sequence sets by a fifth specified value to obtain a sequence set $B_m$, wherein $0 \leq m \leq M-1$, m is an integer, $0 \leq Y \leq L2-1$, Y is an integer, and L2 is a sequence length of the each sequence; and each sequence set in the M sequence sets contains N2 sequences, wherein N2 is an integer greater than or equal to 1; and combining the obtained sequence sets $B_m$ to form the first sequence set, wherein the first sequence set contains N2×M sequences each having a length L2; or
multiplying an element with an index of Z of each sequence of a sequence set with an index of m in the M sequence sets by a sixth specified value and a seventh specified value respectively to obtain a sequence set $C_m$ and a sequence set $D_m$ and combining the obtained sequence sets $C_m$ and the obtained sequence sets $D_m$ in a specified manner to form a sequence set $E_m$, wherein $0 \leq m \leq M-1$, m is an integer, $0 \leq Z \leq L3-1$, Z is an integer, and L3 is a sequence length of the each sequence; each sequence set in the M sequence sets contains N3 sequences, wherein N3 is an integer greater than or equal to 1; and the sequence set $E_m$ contains N3 sequences each of a length L3×2; and combining the obtained sequence sets $E_m$ to form the first sequence set, wherein the first sequence set contains N3×M sequences each having a length L3×2.

17. The method of claim 16, wherein determining a value of the first specified element of the second sequence according to a fourth specified element of the second sequence to obtain the first sequence comprises: using a product of the third power of each element of the fourth specified elements of the second sequence as the value of the first specified element of the second sequence, and using the obtained sequence as the first sequence; or using a product of the square of the element contained in the fourth specified elements of the second sequence and a specified value as the value of the first specified element of the second sequence, and using the obtained sequence as the first sequence.

18. A device, comprising a memory, a processor, and a computer program stored in the memory and executable by the processor, wherein when executing the computer program, the processor implements the data processing method according to claim 16.

* * * * *